United States Patent
Ciampolini et al.

(10) Patent No.: US 10,277,088 B2
(45) Date of Patent: Apr. 30, 2019

(54) METHOD TO CONSTRUCT AN ELECTRIC MACHINE HAVING A STATOR WINDING WITH RIGID BARS

(71) Applicant: MAGNETI MARELLI S.p.A, Corbetta (IT)

(72) Inventors: Franco Ciampolini, Bologna (IT); Marco Magri, Bologna (IT)

(73) Assignee: MAGNETI MARELLI S.p.A, Corbetta (IT)

( * ) Notice: Subject to any disclaimer, the term of this patent is extended or adjusted under 35 U.S.C. 154(b) by 354 days.

(21) Appl. No.: 15/099,980

(22) Filed: Apr. 15, 2016

(65) Prior Publication Data
US 2016/0308426 A1 Oct. 20, 2016

(30) Foreign Application Priority Data
Apr. 16, 2015 (IT) .............................. BO2015A0189

(51) Int. Cl.
  *H02K 3/50* (2006.01)
  *H02K 15/00* (2006.01)
  *H02K 15/04* (2006.01)

(52) U.S. Cl.
  CPC ........... *H02K 3/50* (2013.01); *H02K 15/0081* (2013.01); *H02K 15/0421* (2013.01); *H02K 2203/09* (2013.01)

(58) Field of Classification Search
  CPC .. H02K 3/12; H02K 3/28; H02K 3/50; H02K 15/02; H02K 15/04; H02K 15/0081; H02K 15/0421; H02K 2203/09
  See application file for complete search history.

(56) References Cited

U.S. PATENT DOCUMENTS 6,314,780 B1 * 11/2001 Naka ................... H02K 15/0414
                                                                72/213
6,791,227 B2 * 9/2004 Yasuhara ................. H02K 3/12
                                                                310/179

(Continued)

FOREIGN PATENT DOCUMENTS

EP    1416610 A1    5/2004
EP    2437378 A1    4/2012
(Continued)

OTHER PUBLICATIONS

Search Report and Written Opinion dated Dec. 14, 2015 for Italian Patent Application No. BO20150189.

(Continued)

*Primary Examiner* — Carl Arbes
(74) *Attorney, Agent, or Firm* — Howard & Howard Attorneys PLLC

(57) ABSTRACT

A method to construct an electric machine provided with: a stator having a magnetic core longitudinally crossed by a plurality of stator slots; a stator winding having a series of rigid bars, which are "U"-shaped and are inserted through the stator slots defining an entry side, in which the cusps of the "U"-shaped bars are placed, and an exit side, in which the legs of the "U"-shaped bars are placed; the construction method comprises the steps of electrically connecting the ends of at least two non-adjacent legs to one another by means of a connection bridge, which is made of a flat plate arranged perpendicular to the central axis of rotation and has, for each leg, a corresponding "U"-shaped seat, which is suited to receive the end of the leg.

10 Claims, 21 Drawing Sheets

(56) References Cited

U.S. PATENT DOCUMENTS

| | | | | |
|---|---|---|---|---|
| 7,140,098 B2* | 11/2006 | Maeda | ............... | H02K 15/0414 |
| | | | | 29/732 |
| 8,661,868 B2* | 3/2014 | Guercioni | .......... | H02K 15/0428 |
| | | | | 29/598 |
| 8,680,733 B2* | 3/2014 | Osada | ...................... | H02K 3/14 |
| | | | | 310/179 |
| 8,826,513 B2* | 9/2014 | Guercioni | .......... | H02K 15/0031 |
| | | | | 29/596 |
| 8,881,371 B2* | 11/2014 | Guercioni | ................ | H02K 3/12 |
| | | | | 29/596 |
| 2001/0052734 A1 | 12/2001 | Shimamoto et al. | | |
| 2008/0116755 A1* | 5/2008 | Sahara | .................. | H02K 3/522 |
| | | | | 310/71 |
| 2012/0007460 A1 | 1/2012 | Kitamura et al. | | |

FOREIGN PATENT DOCUMENTS

| | | | |
|---|---|---|---|
| WO | 2012014233 A1 * | 2/2012 | |
| WO | 2013045986 A2 | 4/2013 | |

OTHER PUBLICATIONS

Communication dated Sep. 1, 2016 enclosing the Extended European Search Report dated Aug. 23, 2016 issued by the European Patent Office for European Patent Application No. 16165691.

* cited by examiner

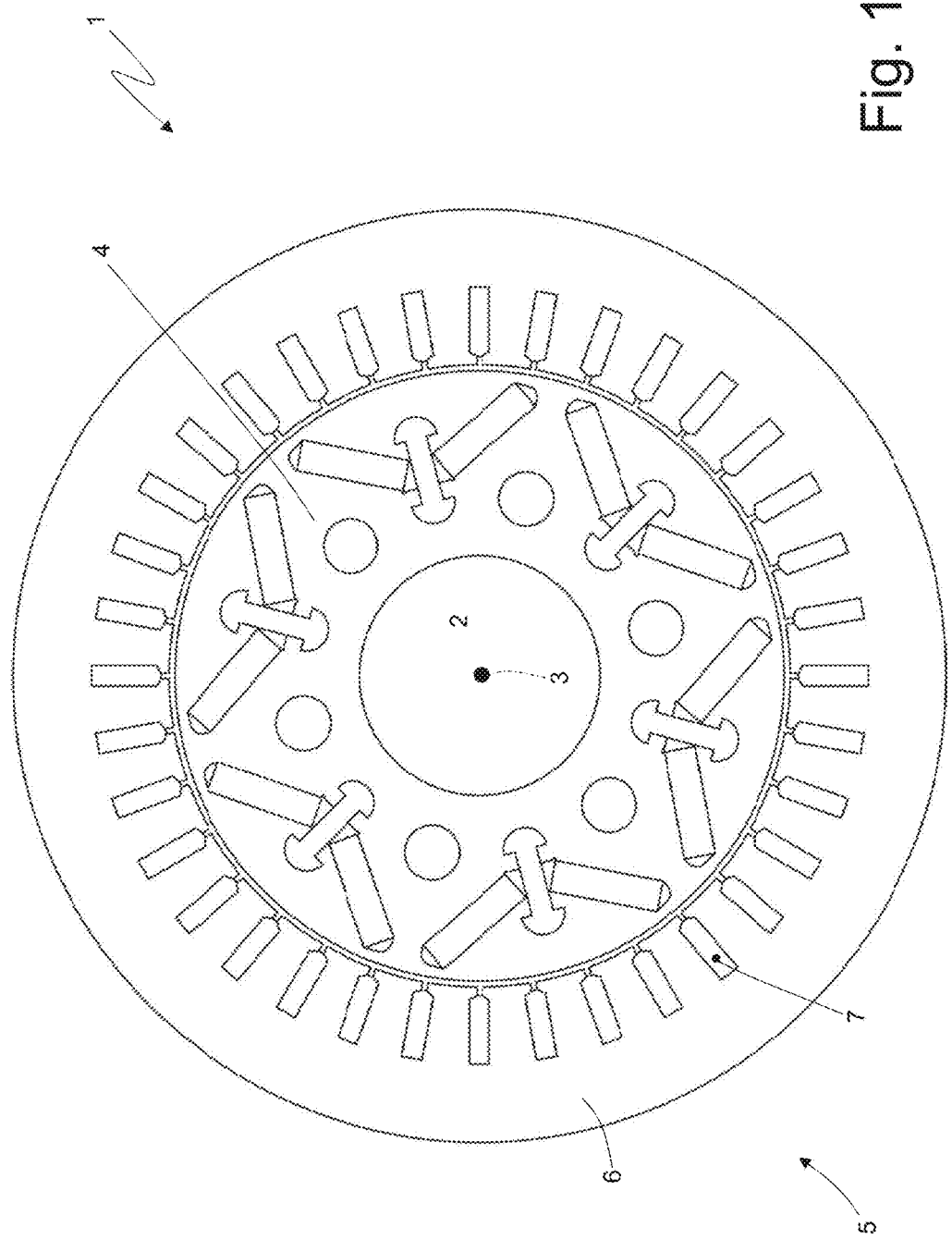

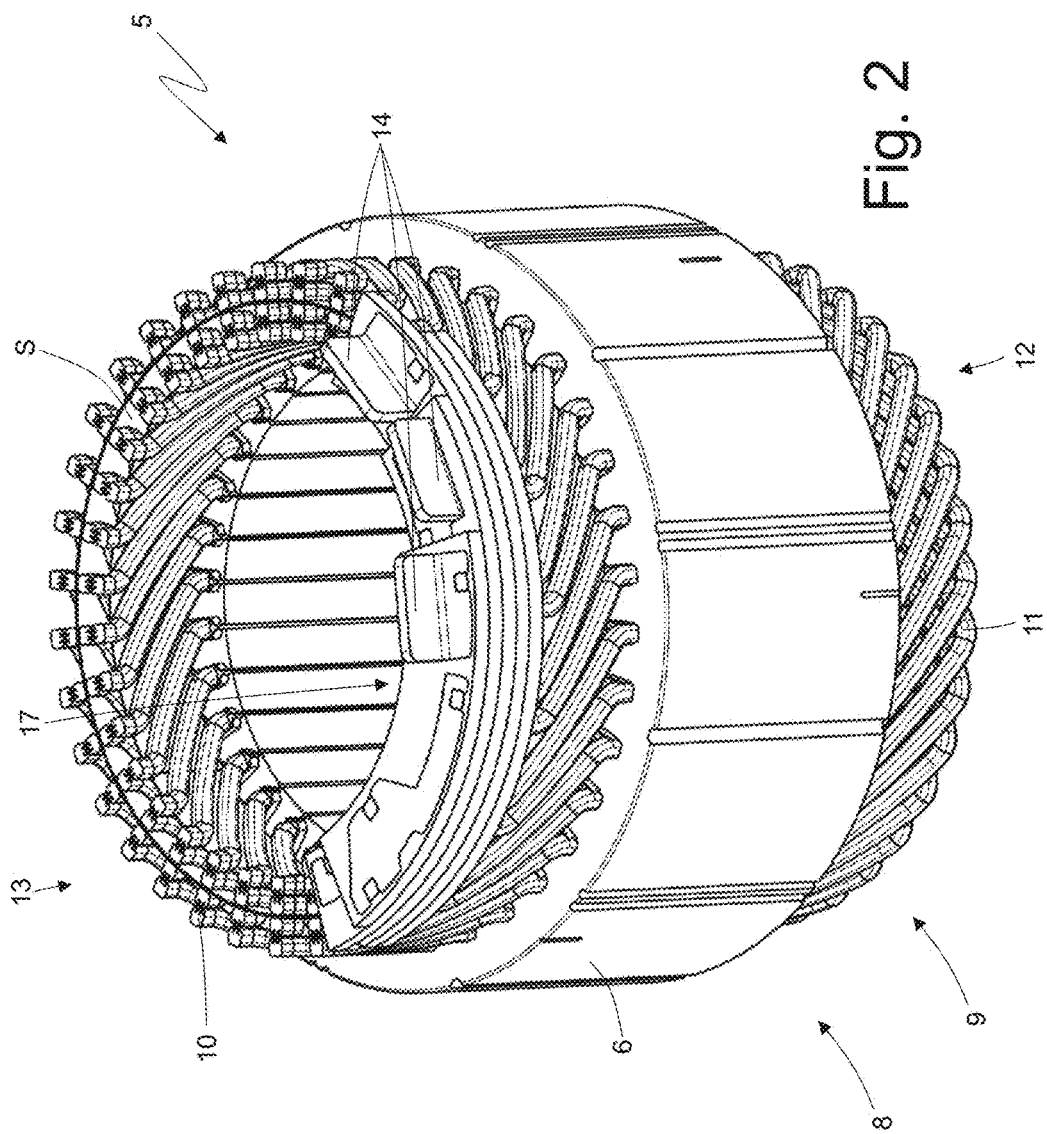

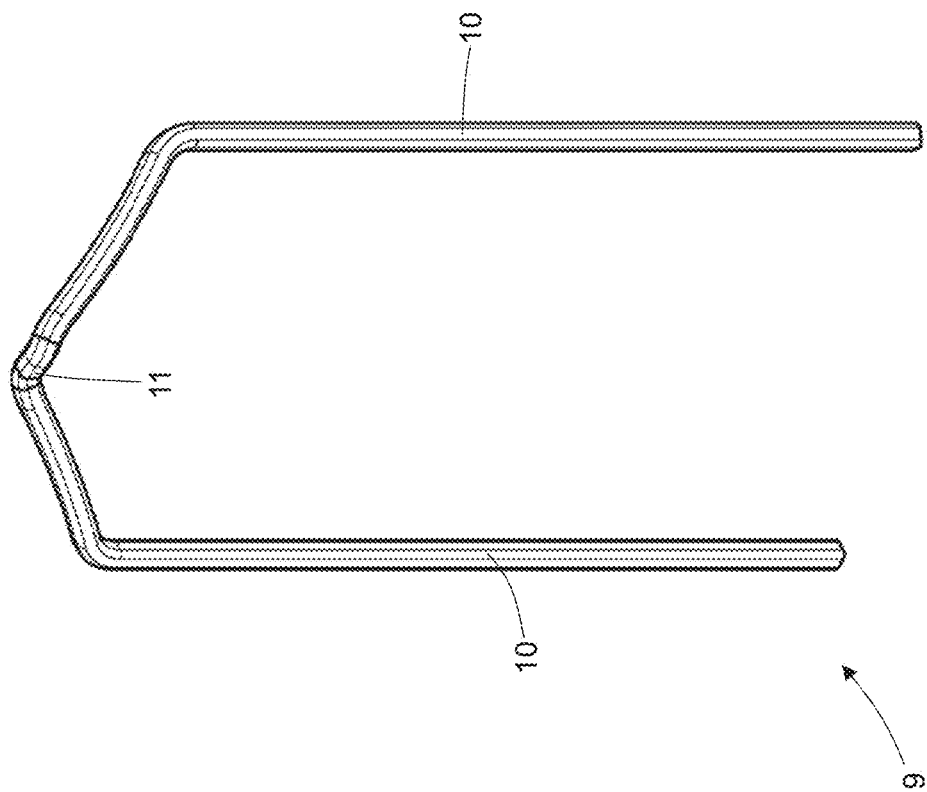

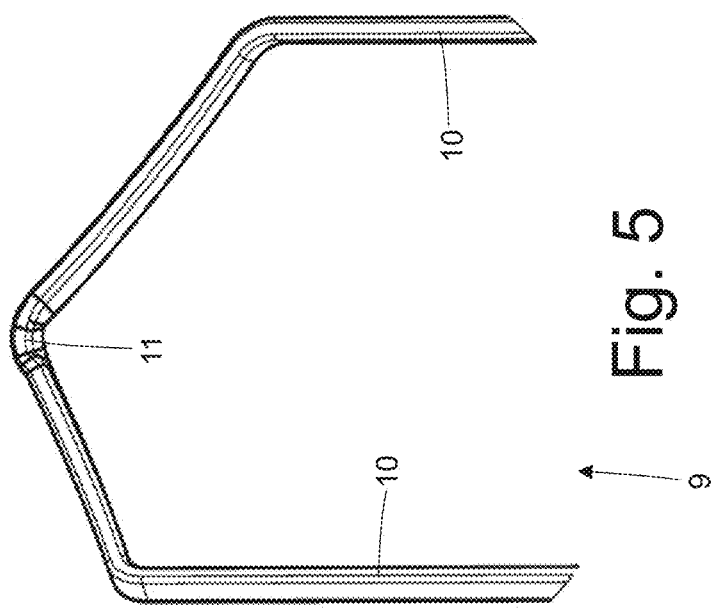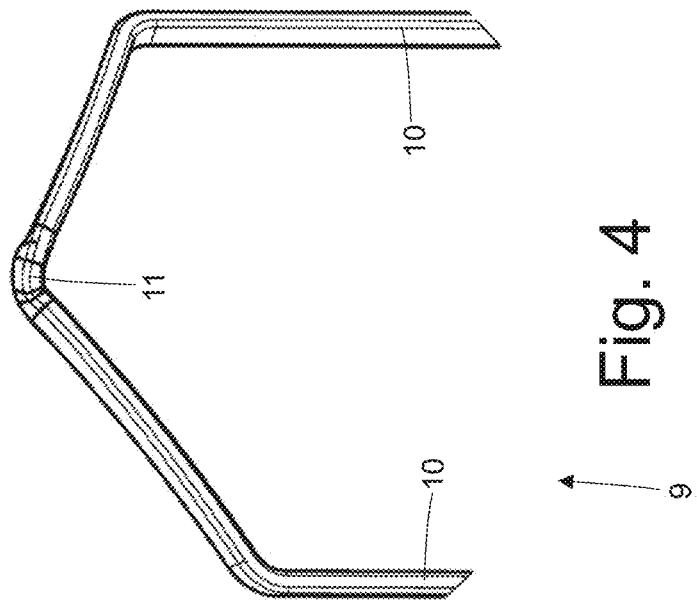

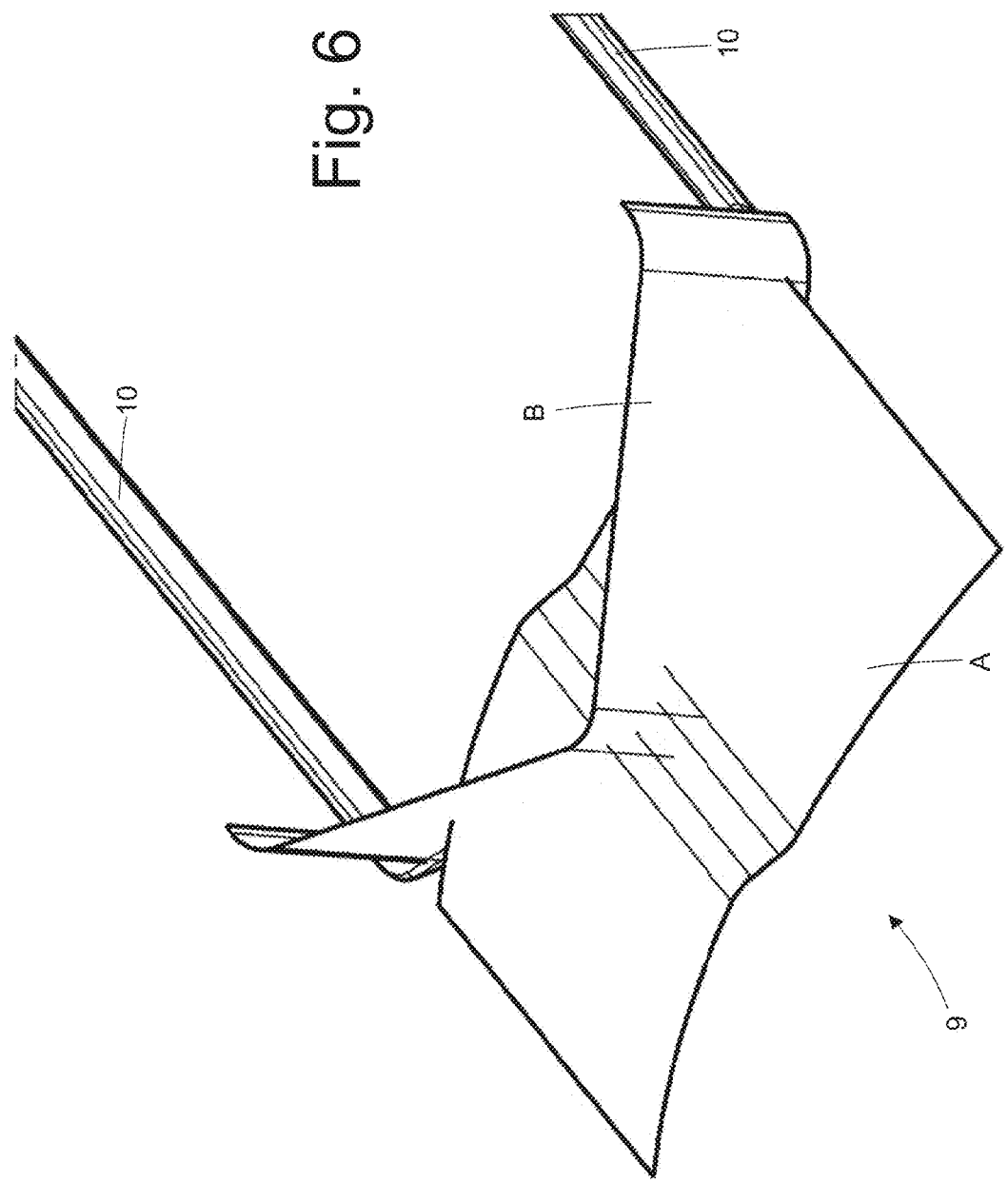

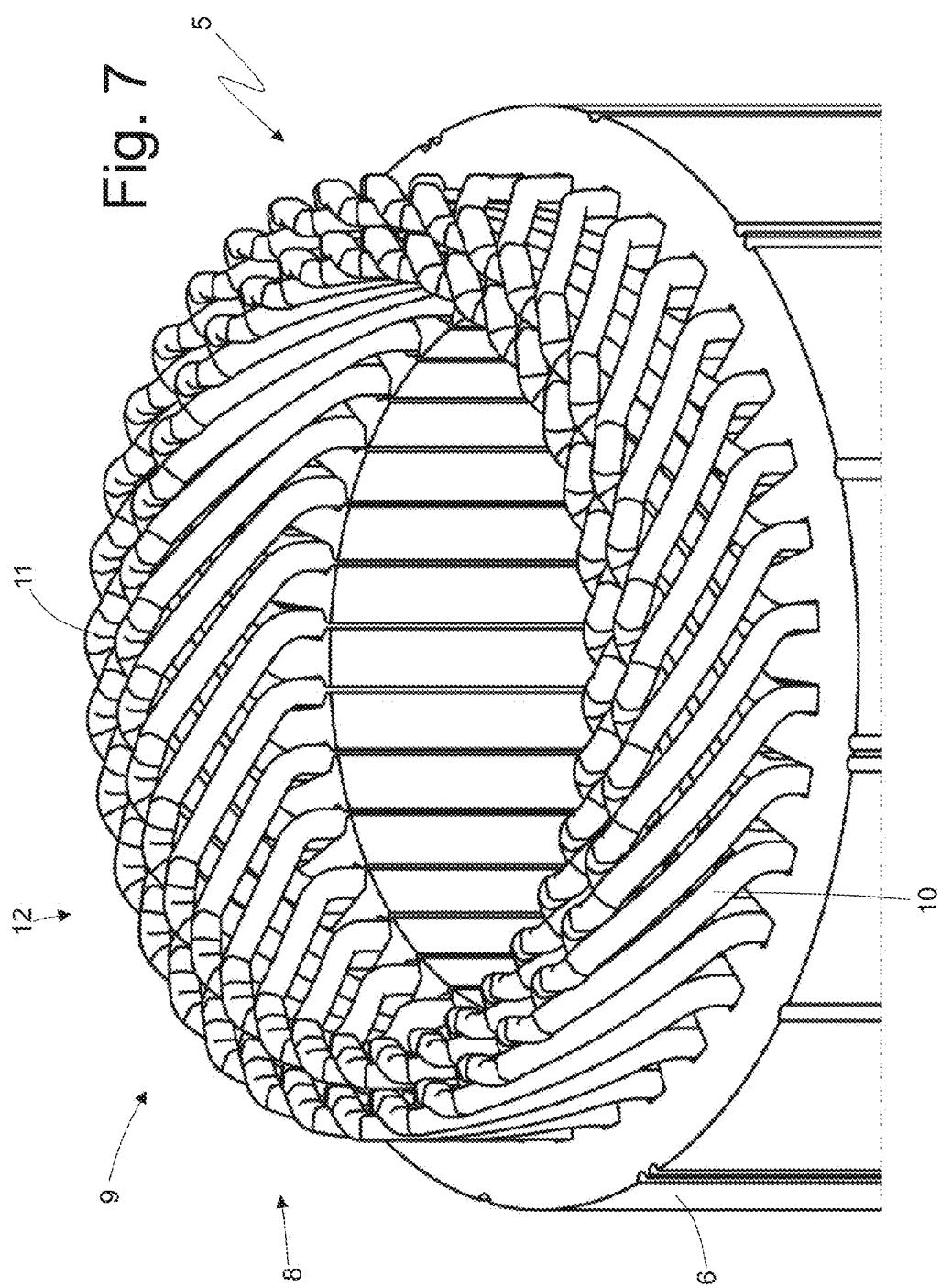

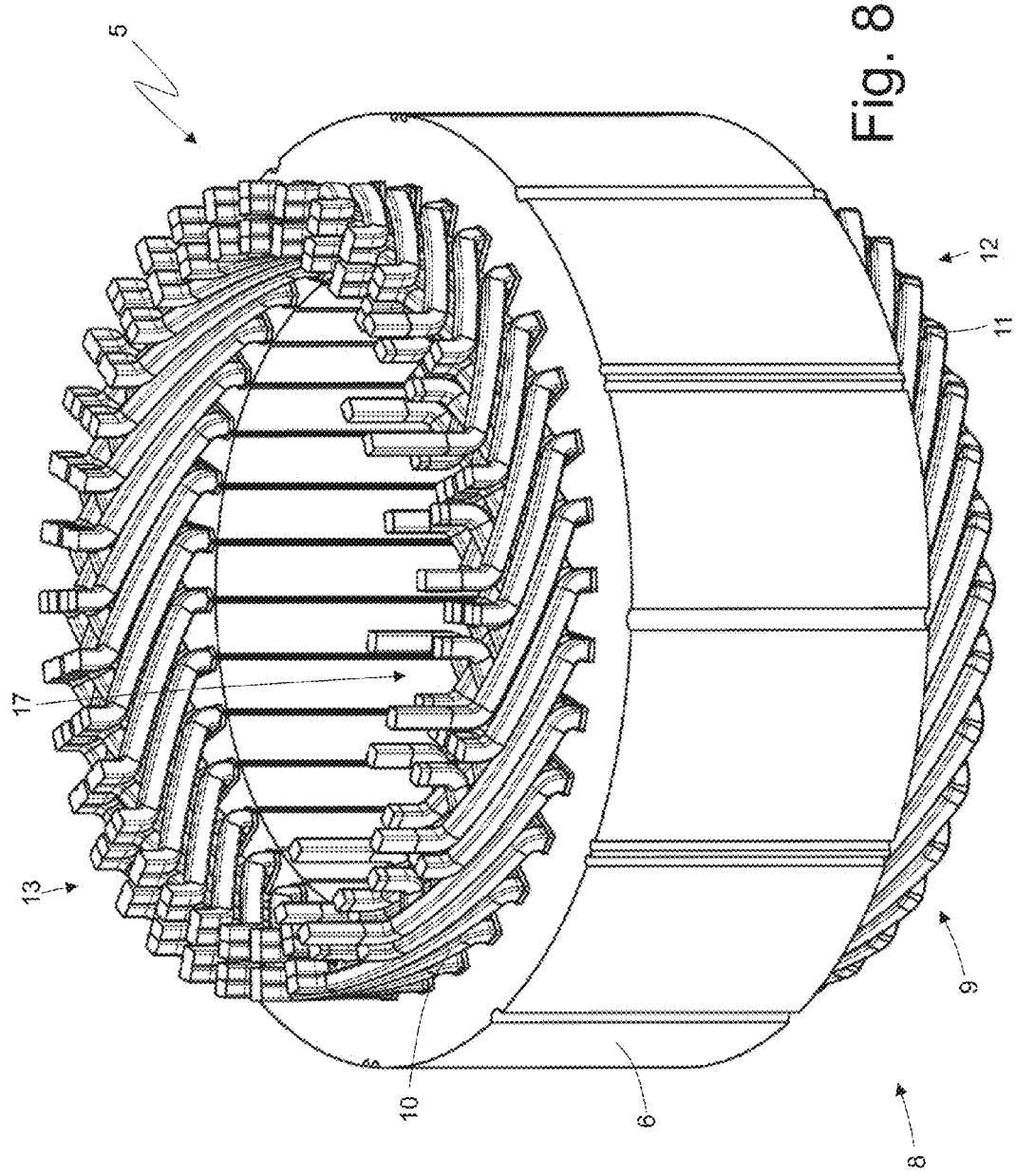

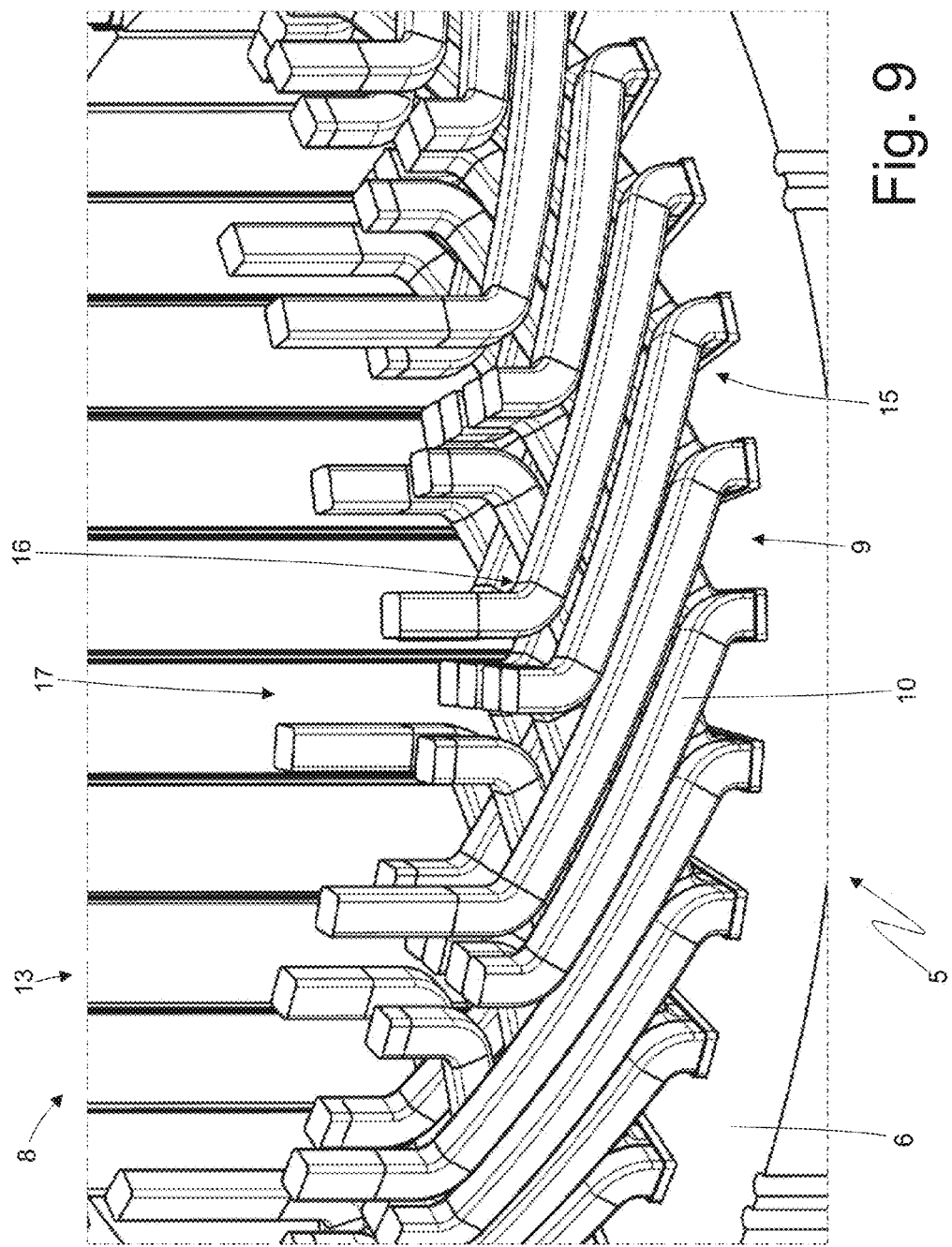

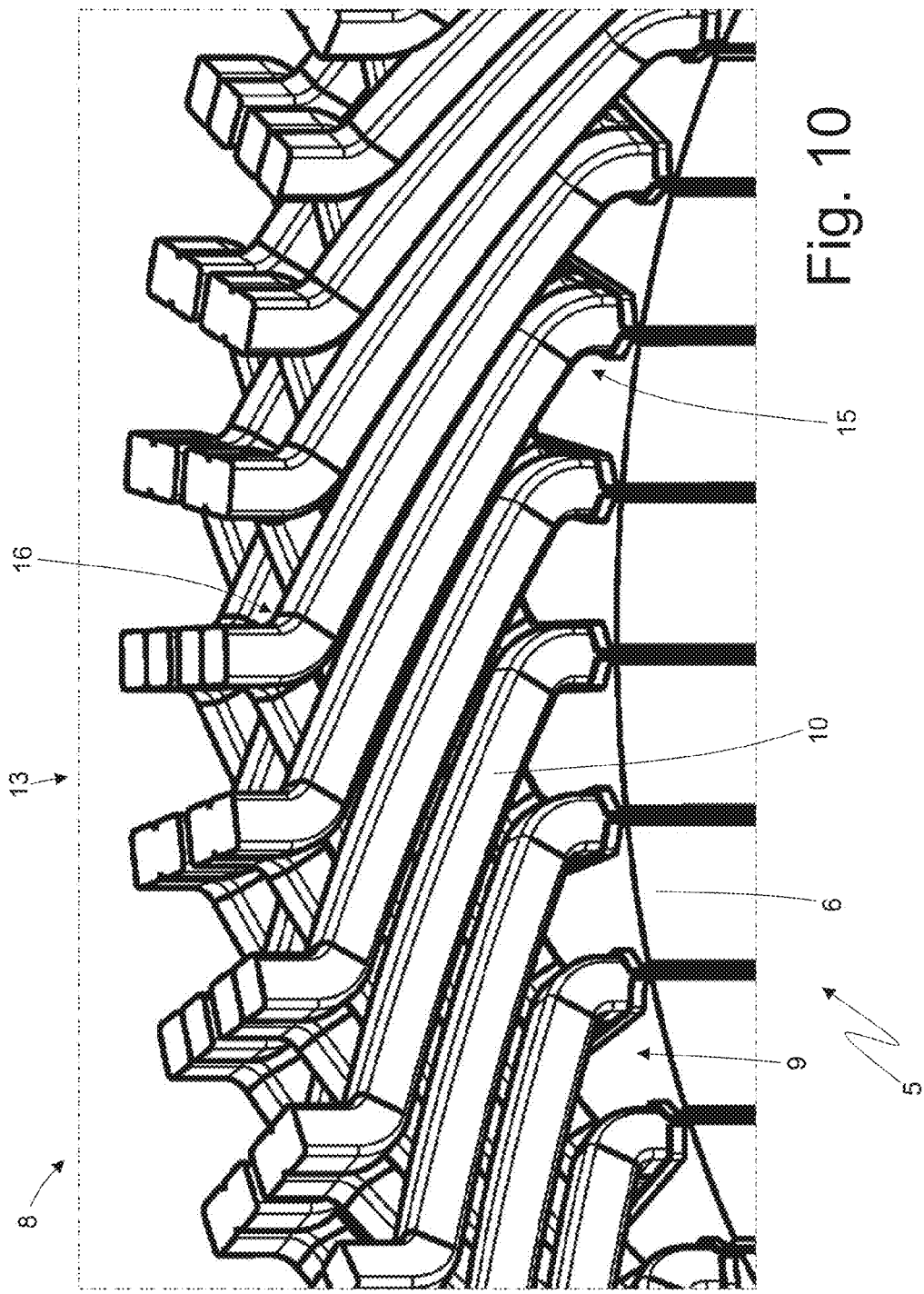

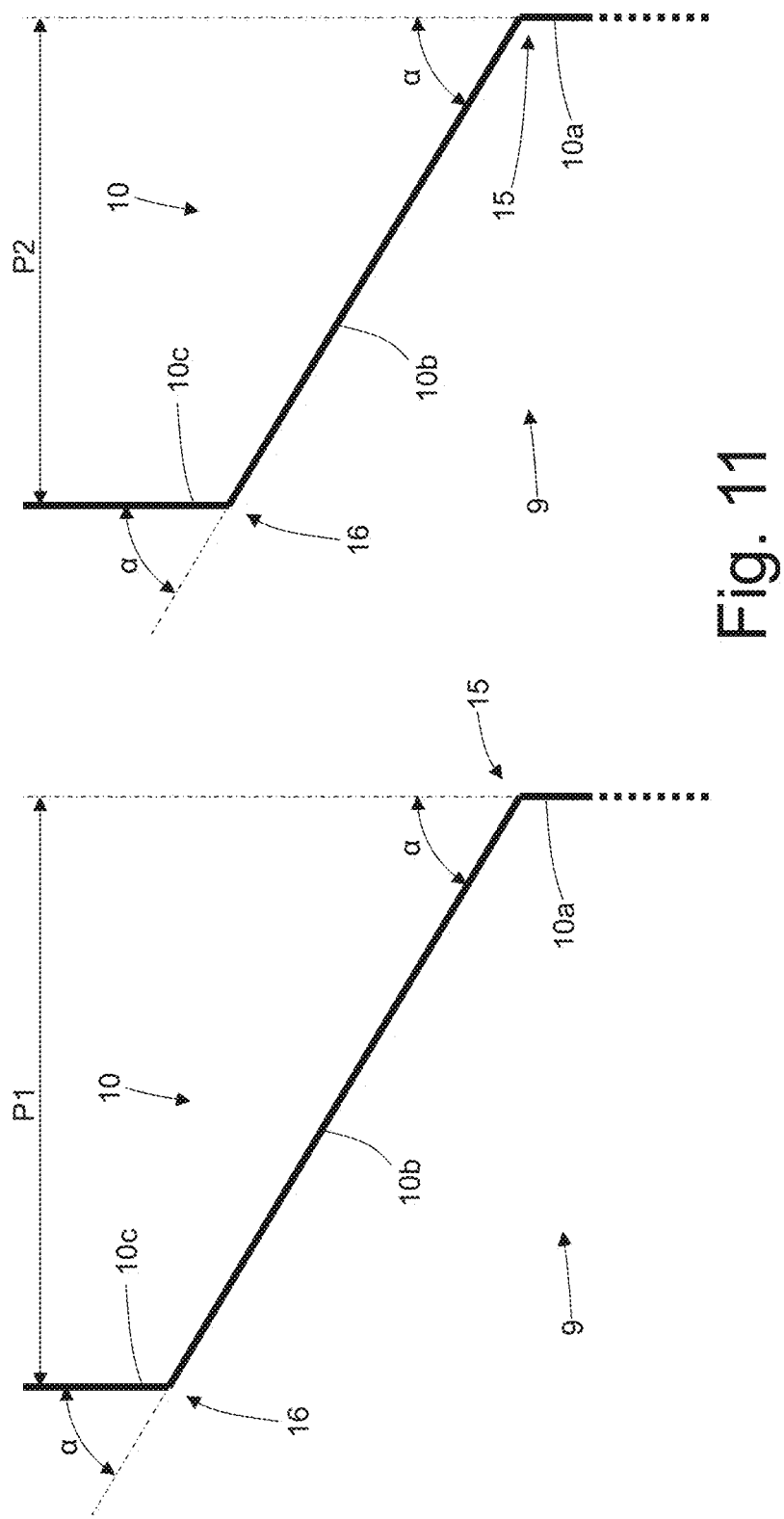

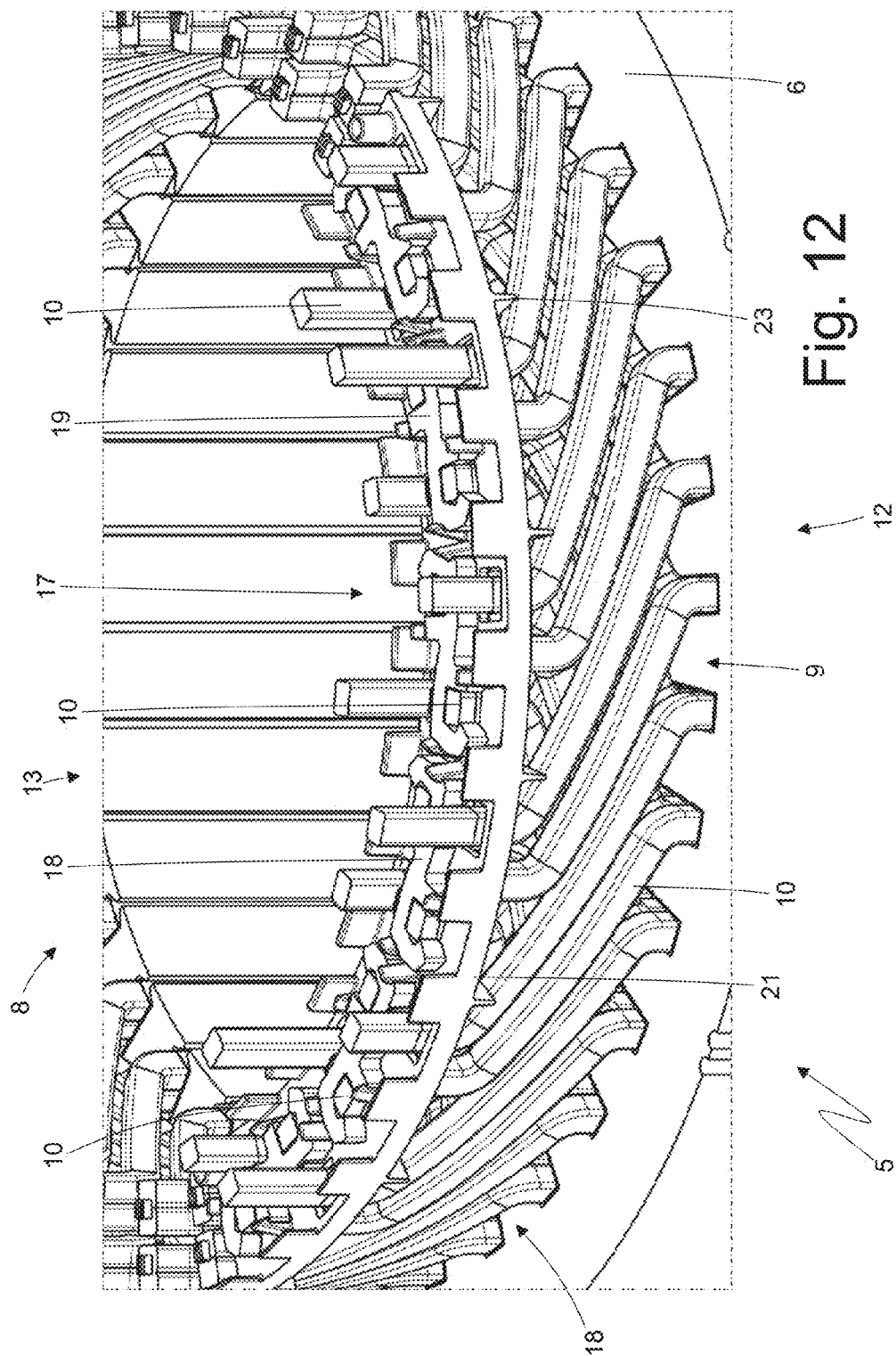

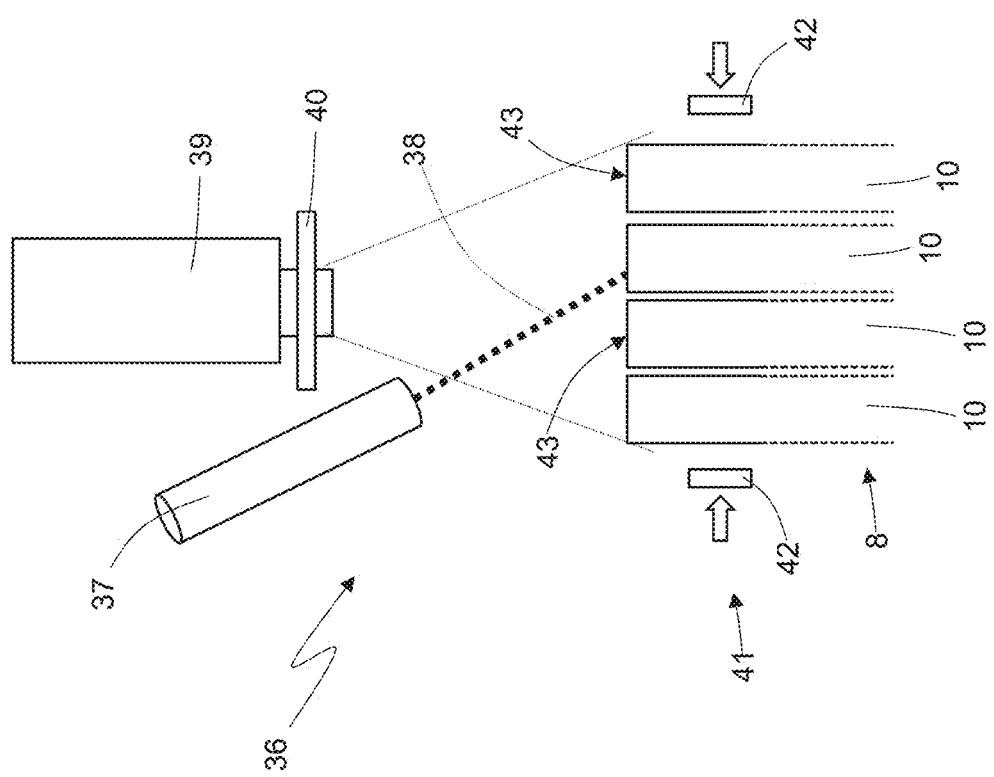

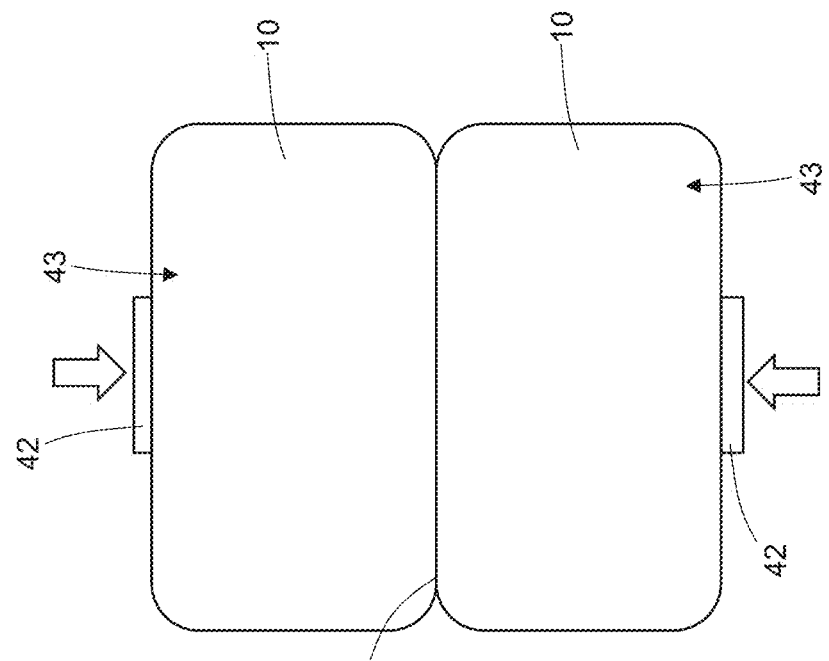
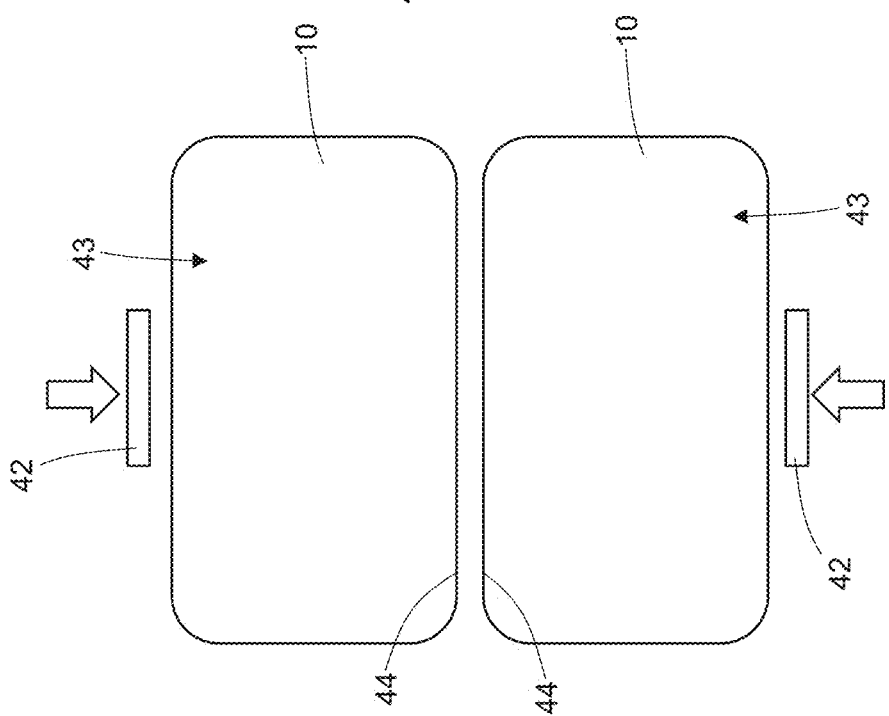

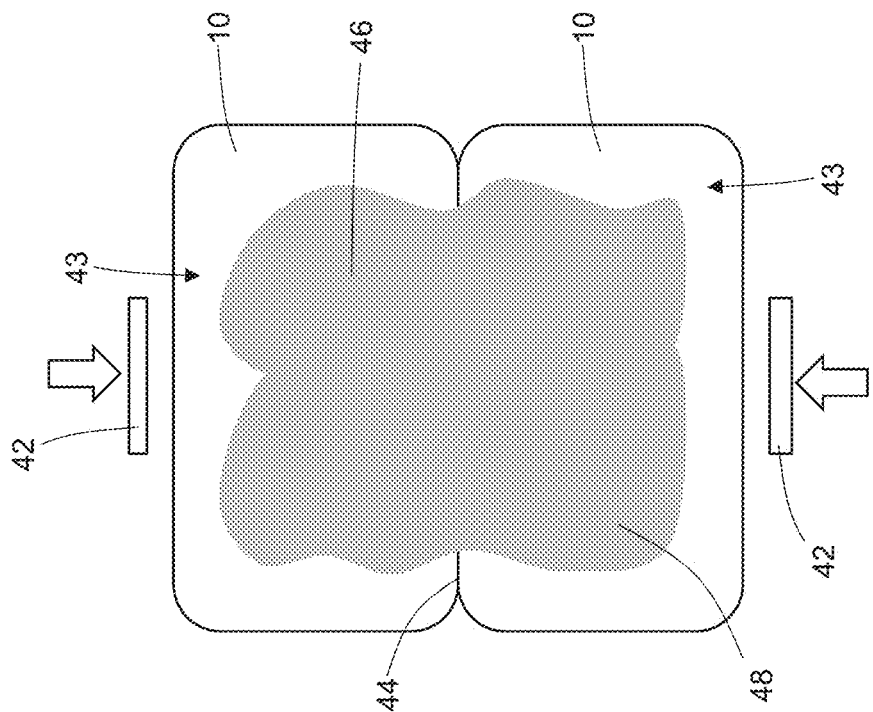
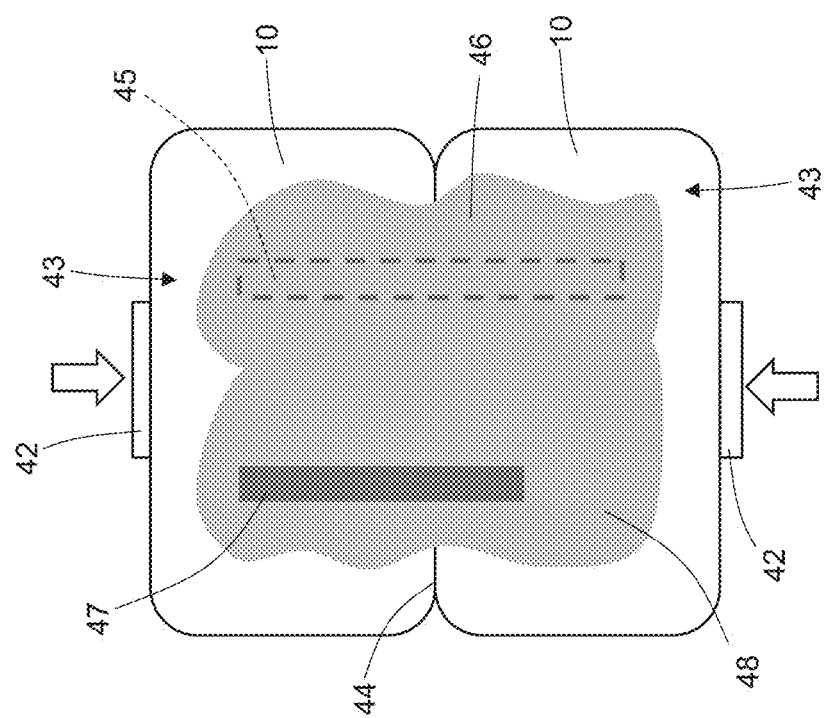

METHOD TO CONSTRUCT AN ELECTRIC MACHINE HAVING A STATOR WINDING WITH RIGID BARS

TECHNICAL FIELD

The present invention relates to a method to construct an electric machine having a stator winding with rigid bars.

PRIOR ART

Patent application EP2437378A1 describes an electric machine having a stator winding with rigid bars. In a stator winding made of rigid bars, a series of rigid bars are used, which are initially shaped into a "U" and are then axially inserted into the stator slots, thus defining an entry side, in which the cusps of the "U"-shaped bars are placed, and an exit side, in which the legs (i.e. the straight portions) of the "U"-shaped bars are placed. Once the bars have been inserted into the stator slots, the legs on the exit side are bent and then the free ends of the legs are connected to one another by means of welding so as to form the electrical paths of the stator winding.

On the exit side, in order to connect the ends of some legs to one another, connection bridges are used, each of which is made of a flat plate arranged perpendicular to the central axis of rotation and has, for each leg, a corresponding "U"-shaped seat, which is suited to receive the end of the leg itself.

However, it was found out that coupling the connection bridges to the stator winding is relatively complex (and therefore difficult to be automated) because it requires some adjustment (performed manually by an operator) in order to properly insert the ends of the legs into the corresponding seats of the connection bridge.

DESCRIPTION OF THE INVENTION

The object of the present invention is to provide a method to construct an electric machine having a stator winding with rigid bars, said method being conceived to be simple and cheap to be produced and, at the same time, to eliminate the drawbacks described above.

According to the present invention, a construction method is provided to construct an electric machine having a stator winding with rigid bars according to the appended claims.

BRIEF DESCRIPTION OF THE DRAWINGS

The present invention will now be described with reference to the accompanying drawings, which show a non-limiting embodiment thereof, wherein:

FIG. 1 is a schematic, cross-sectional view, with parts removed for greater clarity, of an electric machine according to the present invention;

FIG. 2 is a schematic, perspective view, with parts removed for greater clarity, of a stator of the electric machine of FIG. 1;

FIG. 3 is a schematic, perspective view of a "U"-shaped rigid bar that is part of a stator winding of the stator of FIG. 2;

FIGS. 4 and 5 are two different perspective views on a larger scale of a cusp of the rigid bar of FIG. 3;

FIG. 6 is a perspective view highlighting the planes of curvature of a cusp of the rigid bar of FIG. 3;

FIG. 7 is a perspective view of an entry side of the stator of FIG. 2;

FIG. 8 is a perspective view of the stator of FIG. 2 during the construction of the stator winding;

FIGS. 9 and 10 are two views on a larger scale of respective details of FIG. 8;

FIG. 11 is a schematic view showing how corresponding legs of two different "U"-shaped bars of the stator winding are twisted into a "Z"-shape;

FIG. 12 is a further perspective view of part of the stator of FIG. 2 during the construction of the stator winding;

FIG. 19 is a schematic view of a welding station which is used during the construction of the stator winding; and FIGS. 20-25 are six schematic views showing the steps involved in the welding of two adjacent legs of the stator winding.

PREFERRED EMBODIMENTS OF THE INVENTION

Figure 13:
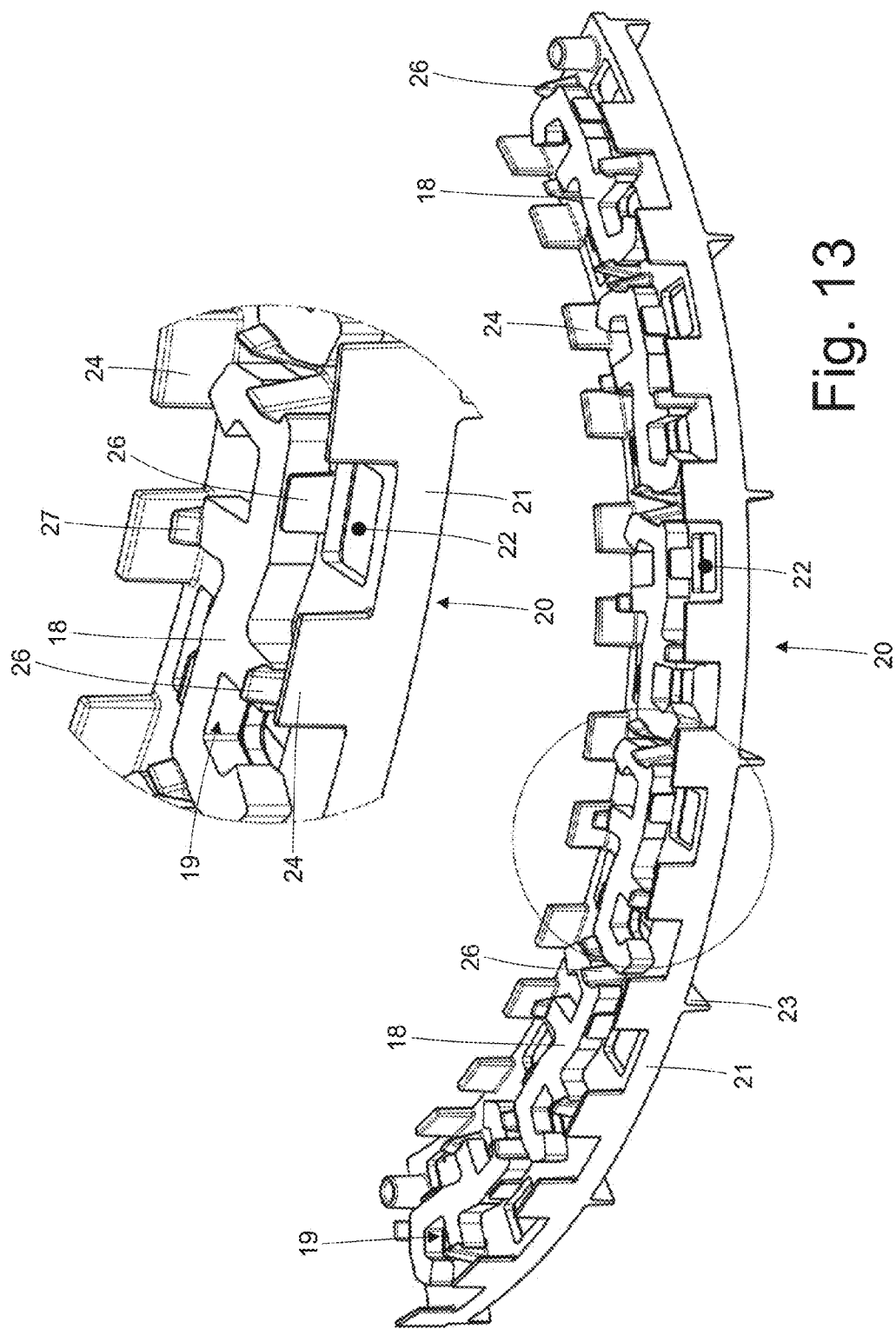
FIG. 13 is a perspective view of a support element which is coupled to connection bridges of the stator winding.

In FIG. 1, number 1 indicates, as a whole, a synchronous electric machine for the automotive industry of the reversible type (i.e. which can act both as an electric motor, by absorbing electrical energy and generating a mechanical driving torque, and as an electric generator, by absorbing mechanical energy and generating electrical energy). The electric machine 1 comprises a shaft 2, which is mounted in a rotatory manner so as to rotate around a central axis 3 of rotation, a permanent magnet rotor 4 splined to the shaft 2 so as to rotate together with the shaft 2 itself, and a cylindrical tubular stator 5 arranged around the rotor 4 so as to surround the rotor 4 itself.

The stator 5 comprises a magnetic core 6, which consists of a series of laminations bound into packs and has a tubular shape with a central hole; the magnetic core 6 is longitudinally crossed by thirty-six stator slots 7 which are uniformly distributed along the internal side of the magnetic core 6 and house a three-phase stator winding 8 (shown in FIG. 2); obviously, the number of slots 7 may be different (for example, forty-eight or seventy-two stator slots 7). In the embodiment shown in the accompanying drawings, the three-phase stator winding 8 is distributed in thirty-six stator slots 7 and the permanent magnet rotor 4 comprises six poles; as a consequence, the synchronous electric machine 1 has two slots for each pole and for each phase.

According to FIG. 2, the three-phase stator winding 8 comprises a series of "U"-shaped rigid bars 9, each comprising two legs 10 which are connected to one another by a cusp 11 (as shown more in detail in FIGS. 3, 4 and 5); the two legs 10 of the same bar 9 constitute two corresponding conductors of the stator winding 8.

As shown more in detail in FIG. 6, the cusp 11 of each "U"-shaped bar 9 has a "three-dimensional" fold, i.e. on two planes A and B that are perpendicular to one another. In particular, the cusp 11 of each "U"-shaped bar 9 has a fold that follows plane A, which is substantially parallel to the lying plane defined by the "U"-shaped bar 9 and is "S"-shaped; furthermore, the cusp 11 of each "U"-shaped bar 9 has a further fold that follows plane B, which is substantially perpendicular to the lying plane defined by the "U"-shaped bar 9 (i.e. it is substantially perpendicular to plane A) and is "U"-shaped.

As clearly shown in FIG. 6, plane A laterally consists of two portions of cylindrical surface, which are centred on the central axis 3 of rotation of the electric machine 1 and have slightly different radii (since a leg 10 of the "U"-shaped bar 9 is inserted into a stator slot 7 placed in a more internal position, namely in correspondence to a smaller radius, while the other leg 10 of the "U"-shaped bar 9 is inserted into a stator slot 7 placed in a more external position, namely in correspondence to a bigger radius); furthermore, in plane A the two portions of cylindrical surface arranged on the sides are centrally joined to one another by an "S"-shaped central portion. As clearly shown in FIG. 6, plane B has a "U"-shape, which causes the corresponding bar 9 to take on a "U"-shape. The "S"-shaped fold along plane A causes the corresponding bar 9 to take on the shape needed both to allow the two legs 10 to be inserted into the corresponding stator slots 7 in different positions (a more internal and a more external position) and to allow the cusps 11 of all "U"-shaped bars 9 to be arranged one beside the other without any mechanical interference with one another (as shown in FIG. 7). It should be pointed out that, in each "U"-shaped bar 9, the two legs 10 are inclined relative to one another (i.e. the two legs 10 form an acute angle between them) and each leg 10 is oriented so as to "face" the central axis 3 of rotation of the electric machine 1.

Thanks to the configuration of the "U"-shaped bars 9 described above, it is possible to build the whole stator winding 8 by bending the bars 9 in correspondence to the cusps 11 in a single bending step before inserting the bars 9 into the corresponding stator slots 7; in other words, once the "U"-shaped bars 9 have been inserted into the corresponding stator slots 7, the cusps 11 are not subject to any further bending. Furthermore, thanks to the configuration of the "U"-shaped bars 9 described above, it is possible to insert the "U"-shaped bars 9 into the corresponding stator slots 7 extremely easily (i.e. with little effort), since the configuration prevents all mechanical interferences between the "U"-shaped bars 9, which would require the insertion of the bars to be forced (namely the bars would have to be pushed with force) in order to slightly deform the "U"-shaped bars 9 themselves; in this way, the construction of the stator winding 8 is quick and easy and, above all, there is no risk of damage to the external insulation of the "U"-shaped bars 9.

Furthermore, thanks to the configuration of the "U"-shaped bars 9 described above, it is possible to reduce the length (and therefore the total weight) of the cusps 11, in other words it is possible to reduce the quantity of copper to be found on the outside of the stator slots 7 (the copper to be found on the outside of the stator slots 7 is needed to enable electrical current to circulate in the stator winding 8, but it is completely useless for the purpose of delivering the mechanical torque to the shaft 2). In other words, the configuration of the "U"-shaped bars 9 described above allows the length (and therefore the total weight) of the cusps 11 to be optimized (minimized).

According to FIG. 2, the "U"-shaped bars 9 are inserted through the stator slots 7 defining an entry side 12, in which the cusps 11 of the "U"-shaped bars 9 are placed, and an exit side 13, in which the legs 10 of the "U"-shaped bars 9 are placed. In particular, each slot accommodates four legs 10 (namely four conductors of the stator winding 8) belonging to four corresponding "U"-shaped rigid bars 9 which are different from one another. The ends of the legs 10 of the "U"-shaped bars 9 are electrically connected to one another (welded) so as to form the electrical paths of the stator winding 8.

According to FIG. 2, the three-phase stator winding 8 comprises three power terminals 14 which constitute the electrical interface with the outside of the stator winding 8 and are electrically connected to an electronic power converter (not shown) which controls the synchronous electric machine 1.

According to a preferred (though not limiting) embodiment shown in FIG. 2, an insulating layer S with an annular shape and made of an electrically insulating material (typically "Nomex®" insulating paper) is interposed between the two internal circles and the two external circles of legs 10 coming out from the exit side 13 of the stator magnetic core 6. Alternatively, it is possible to interpose three insulating layers S with an annular shape and made of an electrically insulating material between the four circles of legs 10, or the insulating layers S with an annular shape and made of an electrically insulating material may not be present at all.

With reference to FIGS. 8-18, below you can find a description of the way in which the stator winding 8 is built.

At first (and as described above) the bars 9 are bent in the middle by 180° so as to become "U"-shaped and take on the shape shown in FIGS. 3-6. This bending operation is preferably carried out by means of an electronically controlled machine tool which gives each bar 9 its final shape in one single operation. The cusps 11 of the "U"-shaped bars 9 are configured in such a way that they are spaced apart by the same number of slots (that is six stator slots 7 in the embodiment shown in the accompanying drawings); in other words, between two legs 10 of the same "U"-shaped bar 9 there is always a skip of six stator slots 7. Furthermore, the legs 10 of the "U"-shaped bars 9 can all have the same length, or they can have different lengths (i.e. the legs 10 of some "U"-shaped bars 9 are slightly longer or shorter than the legs 10 of other "U"-shaped bars 9); the solution according to which the legs 10 of the "U"-shaped bars 9 all have the same length involves a higher consumption of copper, although it is easier to handle, and is therefore normally preferred in case of smaller production volumes.

Once the "U"-shaped bars 9 are ready (in particular, in the stator winding 8 shown in the accompanying figures there are seventy-two "U"-shaped bars 9), each "U"-shaped bar 9 is individually inserted (i.e. alone) into the corresponding two stator slots 7 (namely the two legs 10 of the "U"-shaped bar 9 are axially inserted into the corresponding two stator slots 7). In other words, only one "U"-shaped bar 9 at a time is inserted into two non-adjacent stator slots 7. Preferably, before inserting the "U"-shaped bars 9 into the stator slots 7, each stator slot 7 is internally "coated" with an insulating layer (not shown) made of an electrically insulating material (typically "Nomex®" insulating paper).

Once all the seventy-two "U"-shaped bars 9 have been inserted into the stator slots 7, the corresponding legs 10 coming out from the exit side 13 of the magnetic core 6 are twisted through relative double folds so as to take on a "Z"-shape as shown in FIG. 8. Alternatively, at first only a part (normally half) of the "U"-shaped bars 9 is inserted and, once this first part of the "U"-shaped bars 9 has been inserted, the corresponding legs 10 coming out from the exit side 13 of the magnetic core 6 are twisted through relative double folds so as to take on a "Z"-shape; subsequently, the remaining part (normally the remaining half) of the "U"-shaped bars 9 is also inserted and, once the remaining part of the "U"-shaped bars 9 has been inserted, the corresponding legs 10 coming out from the exit side 13 of the magnetic core 6 are twisted through relative double folds so as to take on a "Z"-shape.

According to a preferred embodiment, during the twisting of the legs 10 of the "U"-shaped bars 9, the legs 10 are not twisted all at once, they are twisted in groups; in other words, the legs 10 of the "U"-shaped bars 9 are divided into at least two groups which are twisted in two consecutive operations (i.e. not simultaneously). While a first group of legs 10 is being twisted, the legs 10 of the second group, which will be twisted at a later time, are temporarily axially moved along the stator slots 7, so as to reduce the length of the portion coming out from the stator slots 7 on the exit side 13 (typically until the length of portion of the legs 10 coming out from the stator slots 7 on the exit side 13 is zero or almost zero). In this way the legs 10 belonging to the second group are not an obstacle to the legs 10 of the first group being twisted, and at the same time the legs 10 of the second group engage the stator slots 7 so as to help keep the legs 10 of the first group still during twisting. Once the first group of legs 10 have been twisted, the legs 10 of the second group are axially moved in the opposite direction so as to go back to their original position and be twisted as well. In this way, the twisting of the legs 10 of the first group is made easier, because said twisting takes place without the obstacle posed by the legs 10 of the second group. The twisting of the legs 10 of the second group is easier anyway, since it takes place once the legs 10 of the first group have already been twisted and therefore take up much less axial space.

Once the twisting of the legs 10 coming out from the exit side 13 of the magnetic core 6 has been completed, and only if necessary, some legs 10 are cut (i.e. trimmed) so as to give them the desired length.

As shown more in detail in the enlargements of FIGS. 9 and 10, each double fold of a leg 10 comprises an internal fold 15 (namely closer to the magnetic core 6 of the stator 5) in one direction and an external fold 16 (namely farther away from the magnetic core 6 of the stator 5) in the opposite direction. By way of example, for each leg 10, the internal fold 15 has a width of about 60° in a direction and the external fold 15 has a width of about 60° in the opposite direction. Each stator slot 7 accommodates four corresponding legs 10 (belonging to four different corresponding "U"-shaped bars) which are twisted in alternately opposite directions through relative "Z"-shaped double folds. In other words, half of the legs 10 are twisted in a clockwise direction at a given angle, while the other half of the legs 10 are twisted in a counter-clockwise direction (that is in the opposite direction) at the same angle.

According to FIG. 11, once the "Z"-shaped double twisting has been performed, each leg 10 has an initial segment 10a which is axially oriented (i.e. parallel to the central axis 3 of rotation of the electric machine 1, and therefore parallel to the stator slots 7), an inclined intermediate segment 10b and a final segment 10c which is axially oriented as well; the intermediate segment 10b joins the initial segment 10a and the final segment 10c, which are parallel to each other, together. In each leg 10, the intermediate segment 10b is inclined by the same angle $\alpha$ (in the embodiment shown, about 60°) both relative to the initial segment 10a and relative to the final segment 10c; in other words, starting from the straight leg 10, the leg 10 is initially twisted at the bottom by an angle $\alpha$ so as to form the internal fold 15 (between the initial segment 10a and the intermediate segment 10b) and the leg 10 is then twisted at the top by the angle $\alpha$ so as to form the external fold 16 (between the intermediate segment 10b and the final segment 10c).

In each leg 10, due to the "Z"-shaped double fold, the initial segment 10a and the final segment 10c are parallel to one another (i.e. they are both axially oriented) and spaced apart from one another by a pitch that can take on a higher value P1 or a lower value P2 (in the embodiment shown in the accompanying drawings, pitch P1 corresponds to the distance existing between three stator slots 7, while pitch P2 corresponds to the distance existing between two and a half stator slots 7). In order to differentiate pitch P1 from pitch P2, it is not the twisting angle $\alpha$ that is varied (in fact, all legs 10 are always twisted by the same angle $\alpha$ in order to form the double folds), but rather the extension of the intermediate segment 10b (and, accordingly, the final segment 10c has a different length, too); in other words, in order to obtain the longer pitch P1, a longer intermediate segment 10b is used, while in order to obtain the shorter pitch P2, a shorter intermediate segment 10b is used, while always keeping the twisting angle $\alpha$ used to form the double folds unchanged.

As already mentioned above, all "U"-shaped bars 9 are spaced apart by the same number of slots, i.e. between the two legs 10 of all "U"-shaped bars 9 there is a skip of six stator slots 7; as a consequence, in order to form the electrical paths of the stator winding 8, it is necessary that the legs 10 of the "U"-shaped bars 9 are differentiated in their "Z"-shaped double folds: as described above with reference to FIG. 11, the majority of the legs 10 of the "U"-shaped bars 9 have a standard "Z"-shaped double fold with pitch P1 (corresponding to the distance existing between three stator slots 7), while a small part of the legs 10 of the "U"-shaped bars 9 have a shortened "Z"-shaped double fold with pitch P2 (corresponding to the distance existing between two and a half stator slots 7). As an alternative to the shortened "Z"-shaped double fold with pitch P2 (corresponding to the distance existing between two and a half stator slots 7), it may be possible to use an extended version of the "Z"-shaped double fold with a pitch P1 (corresponding to the distance existing between three stator slots 7).

As shown in FIG. 8, the legs 10 of the "U"-shaped bars 9 having the shortened "Z"-shaped double fold (pitch P2) are concentrated in an interconnection area 17 of the stator winding 8, which has an extension of about one fourth of the whole stator winding 8 and which also accommodates the power terminals 14.

Once the legs 10 of the "U"-shaped bars 9 have been twisted, the upper ends of the legs 10 of the "U"-shaped bars 9 are electrically connected to one another (by means of laser welding, as described more in detail below) so as to form the electrical paths of the stator winding 8.

In correspondence to the interconnection area 17 of the stator winding 8, some legs 10 have longer (more extended) terminal ends 10c, so as to form some of the electrical connections of the stator winding 8 as described below.

As shown in FIG. 12, in order to allow the electrical paths of the stator winding 8 to be formed in the part of the stator winding 8 corresponding to each phase, the ends of at least one pair of non-adjacent legs 10 (which therefore can not be directly welded to one another) are electrically connected to one another by means of a connection bridge 18. As shown in FIG. 12, in the stator winding 8 pictured in the accompanying drawings each phase comprises two corresponding connection bridges 18, therefore the whole stator winding 8 has a total of six connection bridges 18. According to a preferred embodiment, each connection bridge 18 is made of a flat plate arranged perpendicular to the central axis 3 of rotation of the electric machine 1 and has two opposite seats 19 that engage the ends of the respective legs 10. Once the ends of the legs 10 have been coupled to the corresponding connection bridges 18, the end of each leg 10 is welded to the corresponding connection bridge 18 by means of the laser technique (as described more in detail below).

Figure 14:
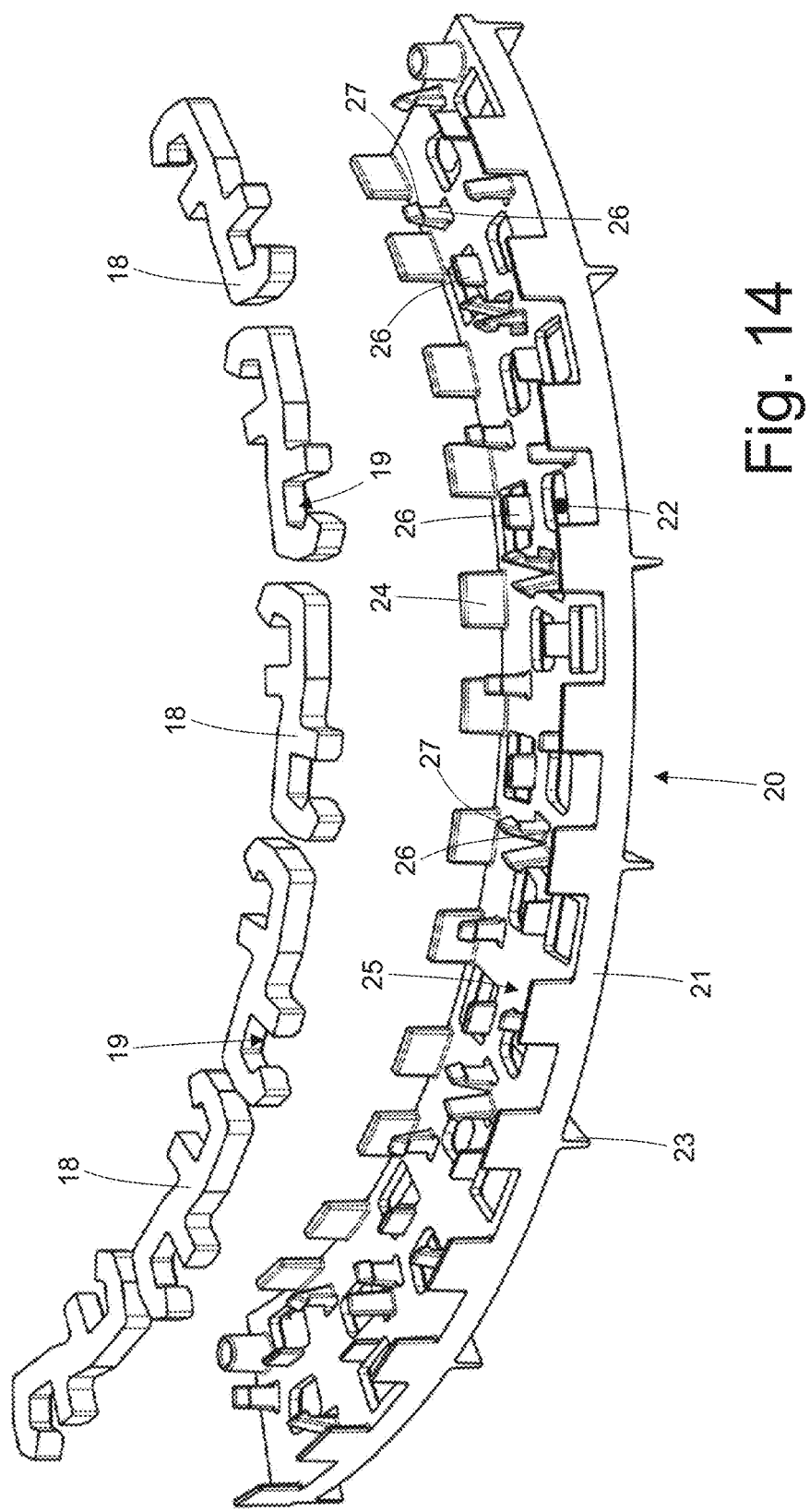
FIG. 14 is an exploded perspective view of the support element of FIG. 13.

According to a preferred embodiment shown in FIGS. 12, 13 and 14, each connection bridge 18 comprises seats 19, each of which is "U"-shaped and suited to receive and accommodate the end of a corresponding leg 10. Each seat 19 initially has a larger cross section (beyond the tolerance needed to simply insert the end of the corresponding leg 10) than the cross section of the corresponding leg 10, so that the leg 10 itself can be inserted into the seat 19 with a certain clearance (beyond the tolerance needed to simply insert the end of the corresponding leg 10) and be "loose" inside the seat 19 itself; in other words, each seat 19 is initially (considerably) larger than the corresponding leg 10 in order to accommodate the leg 10 with a significant clearance and therefore allow the end of the leg 10 to be inserted extremely easily. Once the end of a leg 10 has been inserted into a corresponding seat 19 of a connection bridge 18, the seat 19 is caused to shrink by means of plastic deformation, so as for it to be tight around the leg 10 (i.e. to firmly adhere to the leg 10); in particular, the seat 19 is deformed towards the leg 10 by means of a suitable gripper, so as to be in close contact with (also exerting a certain pressure on) the leg 10 itself.

Each seat 19 is "U"-shaped and is therefore delimited on three sides (the fourth side is open) by two lateral walls and by a rear wall which is interposed between the two lateral walls (i.e. the two lateral walls are arranged on opposite sides of the rear wall). At first (i.e. before the corresponding leg 10 is inserted into the seat 19) the two lateral walls are not parallel to one another (i.e. they tend to diverge from each other) and each forms a corresponding obtuse angle with the rear wall; once the end of the leg 10 has been inserted into the seat 19, the seat 19 is caused to shrink, thus bringing the two lateral walls closer to each other and therefore the two lateral walls become parallel to each other and each forms a corresponding right angle with the rear wall.

In this way, on the one hand it is possible to easily insert the ends of the legs 10 into the corresponding seats 19, and on the other hand it is possible to ensure a firm mechanical coupling without any gaps between the ends of the legs 10 and the corresponding seats 19, so as to ensure that, later on, the ends of the legs 10 and the corresponding seats 19 are properly welded to each other. In other words, thanks to the fact that the seats 19 of each connection bridge 18 are initially larger than the corresponding legs 10, coupling the connection bridge 18 to the stator winding 8 proves to be simple and quick (it can therefore be easily automated); furthermore, thanks to the fact that the seats 19 of each connection bridge 18 are plastically deformed so as for them to be tight around the corresponding legs 10, it is possible to obtain an optimal (mechanical and therefore electric) contact between the connection bridge 18 and the corresponding legs 10.

In order to allow the seats 19 to be easily deformed around the ends of the corresponding legs 10, the connection bridge 18 is made up of a central body with a substantially constant cross-section and of a series of appendages, which project from the central body and are perpendicular to the central body itself; each seat 19 is delimited, on the rear side, by the central body and is laterally delimited by a pair of appendages that are arranged one in front of the other. Preferably, in each seat 19, one appendage is linear (i.e. it has a linear shape in its plan view) and the other appendage is "L"-shaped (i.e. it is "L"-shaped in its plan view); in this way, the "L"-shaped appendage can embrace the end of the corresponding leg 10 on two sides. At first (i.e. before the end of the corresponding leg 10 is inserted), an appendage (in the embodiments shown in the accompanying drawings, the linear appendage) forms a right angle (namely an angle of 90°) with the central body, while the other appendage (in the embodiments shown in the accompanying drawings, the "L"-shaped appendage) initially forms an obtuse angle (namely an angle larger than 90°) with the central body; the deformation of each seat 19 essentially (but not exclusively) involves the appendage that initially forms an obtuse angle with the central body. In other words, the appendage initially forming an obtuse angle with the central body has wider deformation margins, because, before the deformation takes place, it is slightly farther away from the end of the corresponding leg 10 than the other appendage initially forming a right angle with the central body.

The electrical connection between two adjacent ends of two legs 10 is normally established between two legs 10 which are spaced apart from one another by six stator slots 7 (i.e. with a skip of six stator slots 7 obtained by means of the standard "Z"-shaped double fold with pitch P1, which is equal to three slots); furthermore, every time the magnetic core 6 of the stator makes a complete revolution, there must be a skip of five stator slots 7 (obtained by means of the shortened "Z"-shaped double fold with pitch P2, which is equal to two and a half slots) or a skip of seven stator slots 7 (obtained by means of the connection bridges 18), so as to follow the electrical paths of the stator winding 8.

According to a preferred embodiment shown in FIGS. 12-15, an insulating support 20 is provided, which houses the connection bridges 18 and is arranged under the connection bridges 18. According to a preferred embodiment, the insulating support 20 is made of an electrically insulating plastic material. The insulating support 20 comprises a base 21, which is shaped as a circular arc and has a lower surface, which rests against the ends of the legs 10 arranged under it, and an upper surface, on which the connection bridges 18 rest. The base 21 of the insulating support 20 has a plurality of through holes 22, into which some legs are inserted 10, which have to pass through the insulating support 20 in order to be connected to the connection bridges 18 or to be connected to further elements (described below) arranged above the connection bridges 18.

The insulating support 20 comprises a plurality of positioning elements 23, which project downwards from the lower surface of the base 21 and are interlocked in gaps available between the ends of the legs 10 arranged under them (as shown in FIG. 12), so as to both ensure a correct positioning of the insulating support 20, and mechanically constrain the insulating support 20 to the underlying part of the stator winding 8. In the preferred embodiment shown in the accompanying drawings, the positioning elements 23 are arranged perpendicular to the base 21. The insulating support 20 comprises a plurality of columns 24, which project upwards from the upper surface of the base 21 (i.e. from the opposite side and in the opposite direction with respect to the positioning elements 23) and provide a mechanical support for further elements (described below) arranged above the insulating support 20. In the preferred embodiment shown in the accompanying drawings, the columns 24 are arranged circumferentially both on the internal edge and on the external edge of the insulating support 20.

Inside the insulating support 20 there are seats 25 (shown in FIG. 14), each of which is suited to receive without any substantial clearance and to mechanically lock a corresponding connection bridge 18 in the correct position. Each seat 25 is made up of restraining elements 26, which project upwards from the upper surface of the base 21 and are arranged in correspondence to the edge of the corresponding connection bridge 18; at least part of the restraining elements 26 have a tooth 27, which rests on an upper surface of the corresponding connection bridge 18 following an elastic deformation of the restraining element 26 itself. In other words, each connection bridge 18 is forcedly inserted into the corresponding seat 25, so as to determine an elastic deformation of at least part of the restraining elements 26; accordingly, in order to extract a connection bridge 18 from the corresponding seat 25, it is necessary to elastically deform at least part of the restraining elements 26.

The use of the insulating support 20 makes the coupling of the connection bridges 18 to the stator winding 8 considerably easier; in particular, it is possible to pre-assemble (and lock in an interlocking manner) the connection bridges 18 into the corresponding seats 25 of the insulating support 20 far from the stator winding 8 and therefore couple, with a single operation, the insulating support 20, together with all the connection bridges 18, to the stator winding 8. Furthermore, the insulating support 20 allows the connection bridges 18 to be firmly kept in the desired position during the construction of the stator winding 8 (i.e. before the seats 19 of the connection bridges 18 are tightened around the ends of the corresponding legs 10 and before the connection bridges 18 are welded to the ends of the corresponding legs 10).

Figure 15:
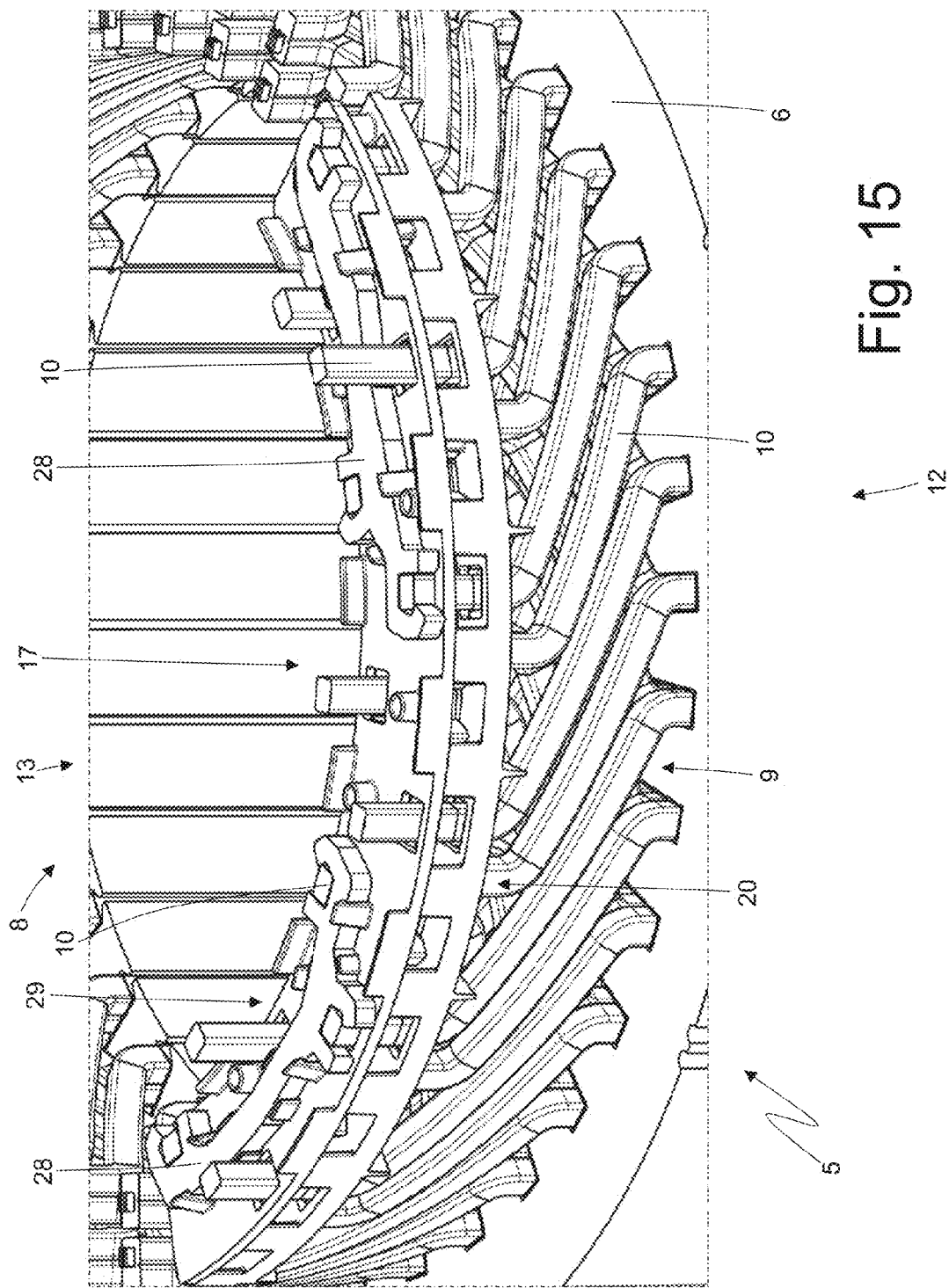
FIGS. 15-18 are further perspective views of part of the stator of FIG. 2 during the construction of the stator winding.

According to FIG. 15, the three ends of the respective legs 10 which form a star-centre of the stator winding 8 are electrically connected to one another by means of a connection bridge 28, which is made of a flat plate arranged perpendicular to the central axis 3 of rotation of the electric machine 1 and has three seats, which engage the ends of the respective legs 10. The connection bridges 28 are similar to the connection bridges 20 described above and therefore comprise respective seats, which are plastically deformed once the ends of the corresponding legs 10 have been inserted into them. As shown in FIG. 15, the stator winding 8 shown in the accompanying drawings comprises two star-connections which, in turn, are connected in parallel to one another (as described more in detail below). The two connection bridges 28 are arranged above the six connection bridges 18. According to a preferred embodiment shown in the accompanying drawings, an insulating support 29 is provided, which houses the connection bridges 28, is arranged under the connection bridges 28, and is similar to the insulating support 20.

In particular, the insulating support 29 rests, on the lower side, on the top of the columns 24 of the insulating support 20. The only substantial difference (obviously apart from the shape and the arrangement of the seats 25) between the insulating support 29 and the insulating support 20 is the fact that the insulating support 29 does not have the positioning elements 23, since it rests on the columns 24 of the underlying insulating support 20. Other than that, the insulating support 29 comprises a base which is crossed by through holes like the insulating support 20, it comprises columns like the insulating support 20, and it has seats provided with restraining elements, which, in case, may have teeth, like the insulating support 20.

Figure 16:
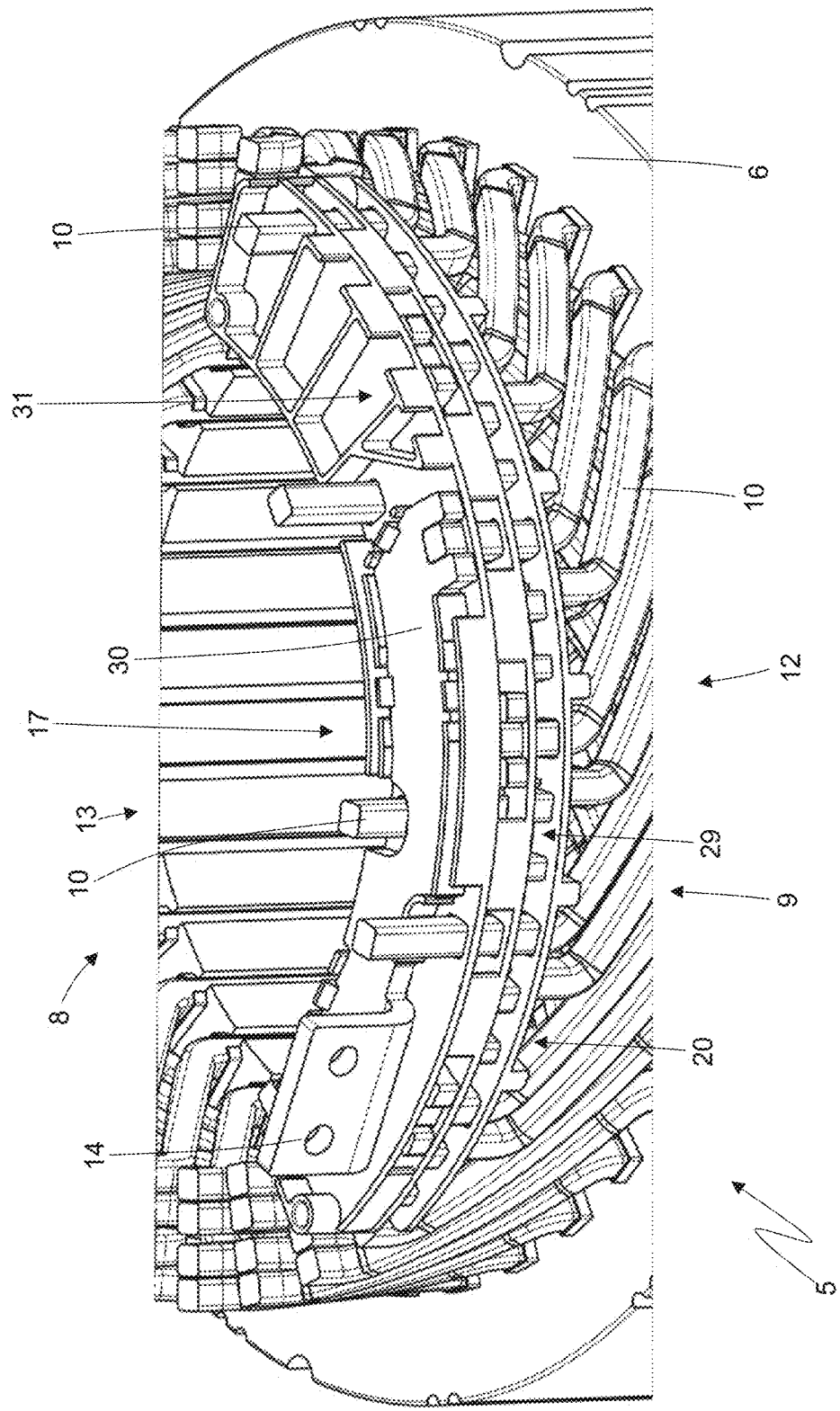

According to FIG. 16, a connection bridge 30 is provided, which has a power terminal 14, is arranged above the connection bridges 28, and is made of a flat plate arranged perpendicular to the central axis 3 of rotation of the electric machine 1 and has two seats, which engage the ends of the respective legs 10. The connection bridge 30 is similar to the connection bridges 20 described above and therefore comprises respective seats, which are plastically deformed once the ends of the corresponding legs 10 have been inserted into them. According to a preferred embodiment shown in the accompanying drawings, an insulating support 31 is provided, which houses the connection bridge 30, is arranged under the connection bridge 30, and is similar to the insulating supports 20 and 29. In particular, the insulating support 31 rests, on the lower side, on the top of the columns of the insulating support 29. The only substantial difference (obviously apart from the shape and the arrangement of the seats 25) between the insulating support 31 and the insulating support 20 is the fact that the insulating support 31 does not have the positioning elements 23, since it rests on the columns of the underlying insulating support 29. Other than that, the insulating support 31 comprises a base which is crossed by through holes like the insulating support 20, it comprises columns like the insulating support 20, and it has seats provided with restraining elements, which, in case, may have teeth, like the insulating support 20.

Figure 17:
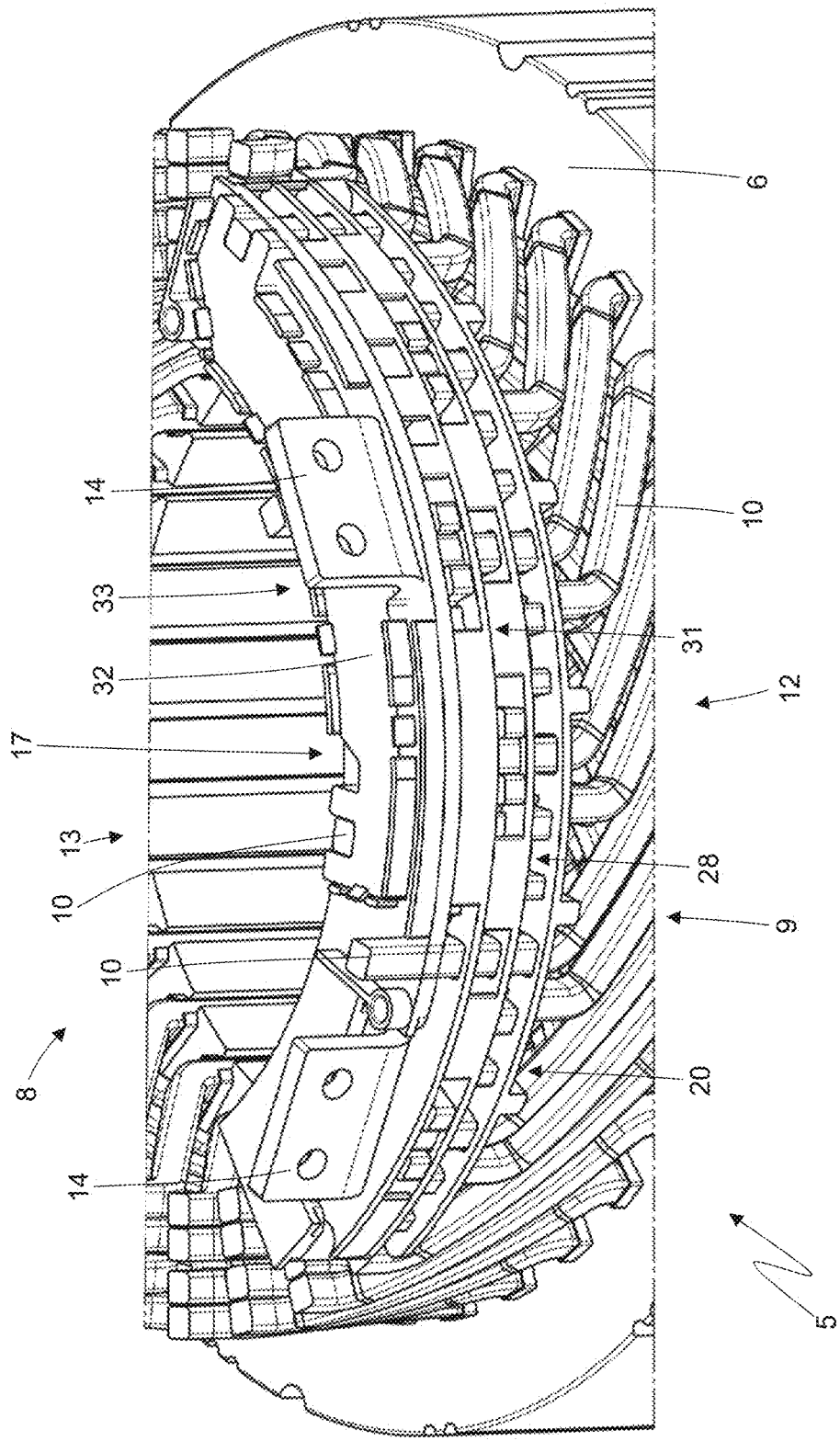

According to FIG. 17, a connection bridge 32 is provided, which has a power terminal 14, is arranged above the connection bridge 30, and is made of a flat plate arranged perpendicular to the central axis 3 of rotation of the electric machine 1 and has two seats, which engage the ends of the respective legs 10. The connection bridge 32 is similar to the connection bridges 20 described above and therefore comprises respective seats, which are plastically deformed once the ends of the corresponding legs 10 have been inserted into them. According to a preferred embodiment shown in the accompanying drawings, an insulating support 33 is provided, which houses the connection bridge 32, is arranged under the connection bridge 32, and is similar to the insulating supports 20, 29 and 31. In particular, the insulating support 33 rests, on the lower side, on the top of the columns of the insulating support 31. The only substantial difference (obviously apart from the shape and the arrangement of the seats 25) between the insulating support 33 and the insulating support 20 is the fact that the insulating support 33 does not have the positioning elements 23, since it rests on the columns of the underlying insulating support 31. Other than that, the insulating support 33 comprises a base which is crossed by through holes like the insulating support 20, it comprises columns like the insulating support 20, and it has seats provided with restraining elements, which, in case, may have teeth, like the insulating support 20.

Figure 18:
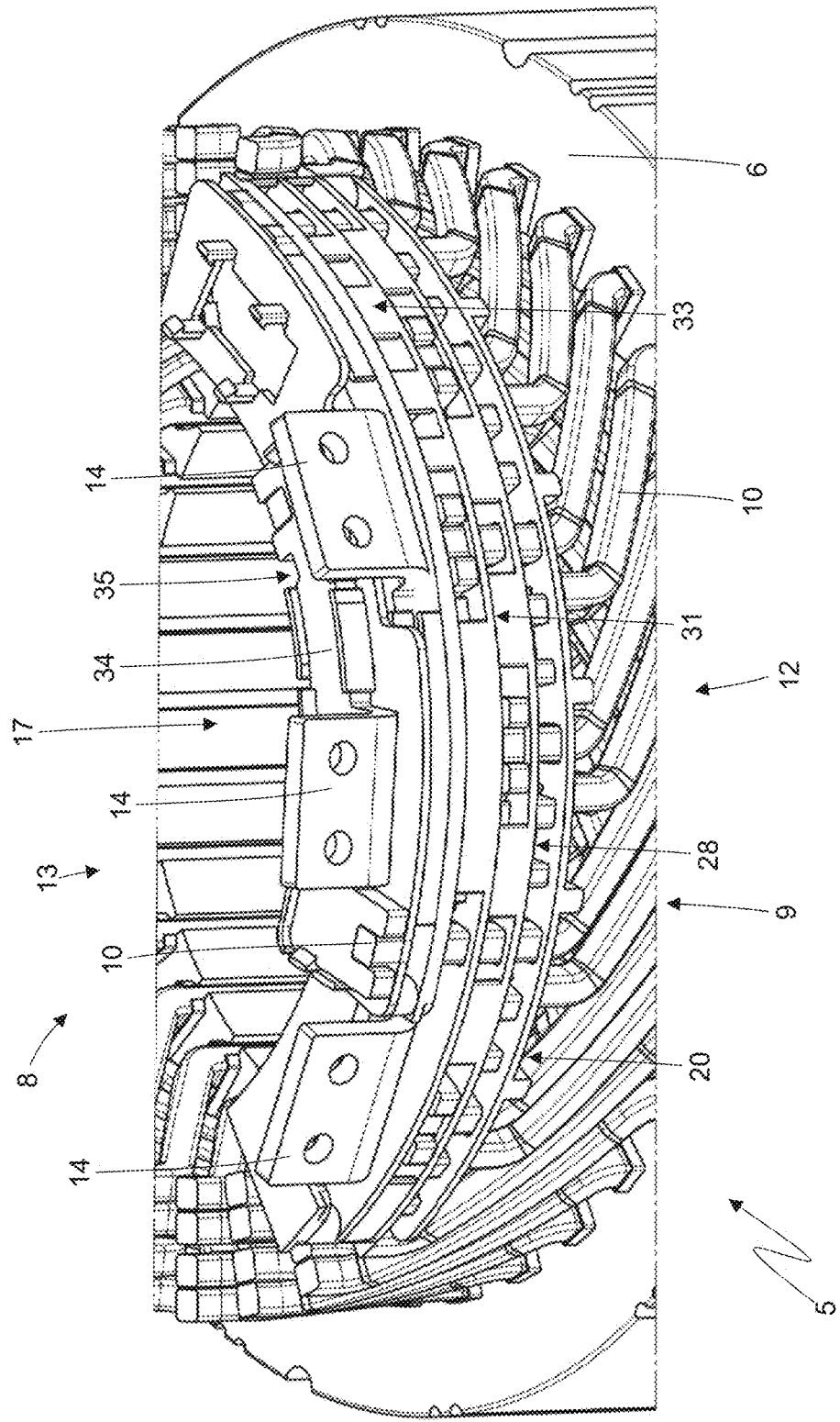

According to FIG. 18, a connection bridge 34 is provided, which has a power terminal 14, is arranged above the connection bridge 32, and is made of a flat plate arranged perpendicular to the central axis 3 of rotation of the electric machine 1 and has two seats, which engage the ends of the respective legs 10. The connection bridge 34 is similar to the connection bridges 20 described above and therefore comprises respective seats, which are plastically deformed once the ends of the corresponding legs 10 have been inserted into them. According to a preferred embodiment shown in the accompanying drawings, an insulating support 35 is provided, which houses the connection bridge 34, is arranged under the connection bridge 34, and is similar to the insulating supports 20, 29, 31 and 33. In particular, the insulating support 35 rests, on the lower side, on the top of the columns of the insulating support 33. The only substantial difference (obviously apart from the shape and the arrangement of the seats 25) between the insulating support 35 and the insulating support 20 is the fact that the insulating support 35 does not have the positioning elements 23, since it rests on the columns of the underlying insulating support 33. Other than that, the insulating support 35 comprises a base which is crossed by through holes like the insulating support 20, it comprises columns like the insulating support 20, and it has seats provided with restraining elements, which, in case, may have teeth, like the insulating support 20.

Thanks to the connection bridges 30, 32 and 34, each power terminal 14 is electrically connected to the ends of two legs 10 which constitute respective terminals of a star connection of the stator winding 8 and which project beyond the corresponding support elements 31, 33 and 35; in this way, the connection bridges 30, 32 and 34 establish the connection in parallel between the two star-connections of the stator winding 8.

In the embodiment shown in the accompanying drawings, five connection bridges 18, 28, 30, 32 and 34 are used, which are arranged one on top of the other (i.e. piled on top of one another); according to other perfectly equivalent embodiments, it is possible to use a different number (for example, four or six) of connection bridges.

With reference to FIGS. 19-25, below you can find a description of the ways in which the welds inside the stator winding 8 are performed, i.e. in which the legs 10 of the "U"-shaped bars 9 are connected to one another or to the connection bridges 18, 28, 30, 32 and 34. FIGS. 19-25 show the welding operation between the ends of two adjacent legs 10, but the welding operation between a leg 10 and a corresponding connection bridge 18, 28, 30, 32 or 34 is performed in a similar way.

According to FIG. 19, the welding operation is performed in a welding station 36 comprising an emitting device 37 which is designed to produce and emit a laser beam 38, which is suited to melt copper, i.e. the metal making up the stator winding 8. The welding station 36 also comprises a video camera 39, which is designed to capture digital images of the elements that have to be welded together (the legs 10 of the "U"-shaped bars 9 in the embodiment shown in FIG. 19). According to a preferred embodiment, the welding station 36 comprises an illuminating device 40, which is suited to illuminate the elements that have to be welded together (the legs 10 of the "U"-shaped bars 9 in the embodiment shown in FIG. 19); preferably, the illuminating device 40 has an annular shape, is arranged around the lens of the video camera 39, and is suited to emit a red light (which enables an optimization of the vision of the elements to be welded during the welding operations) by means of a LED matrix.

According to a preferred embodiment shown in FIG. 19, a compression device 41 is provided, which is mechanically coupled to the legs 10 that have to be welded to one another, so as to push the legs 10 one towards the other and therefore arrange the legs 10 themselves in close contact with one another in order to help establish an optimal electrical connection. The compression device 41 comprises two jaws 42 which are arranged on opposite sides of the group of legs 10 and are mechanically connected to one another so as to tighten the legs 10 between them.

FIGS. 20-25 show how the ends of two adjacent legs 10 are welded in the welding station 36; the two metal elements that have to be welded to one another, i.e. the two legs 10, are arranged one beside the other and have respective upper surfaces 43, which are arranged coplanar to one another and have at least one common edge 44.

At first, and according to FIG. 20, the two adjacent legs 10 that have to be welded to one another are pushed one towards the other by the jaws 42 of the compression device 41. FIG. 20 schematically shows only the two legs 10 that are to be welded to one another and the jaws 42 are directly pressed against both legs 10, while the jaws 42 normally compress a group of four legs 10, as shown in FIG. 19. As shown in FIG. 21, through the action of the jaws 42 of the compression device 41, the two legs 10 come into close contact, thus eliminating undesired gaps, if there are any between the two legs 10 in correspondence to the common edge 44.

Figure 22:
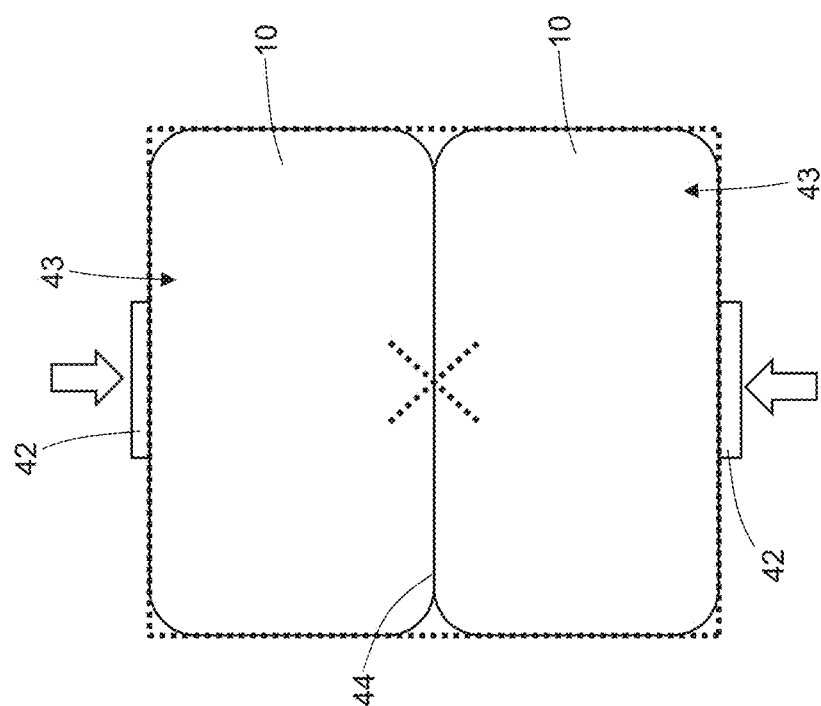

Subsequently, and as shown in FIG. 22, the video camera 39 captures a digital image of the two upper surfaces 43 of both legs 10. Then a control unit analyzes the digital image, in order to both determine the position of the external edges of the two upper surfaces 43 (highlighted with a dotted line in FIG. 22), and determine the position of the corners of the external edges of the two upper surfaces 43. By using the position of the corners of the external edges of the two upper surfaces 43, the control unit determines the position of the center (namely of the barycenter) of the two upper surfaces 43 (indicated by a dotted line cross in FIG. 22). The external edges of the upper surfaces 43 and the center of the two upper surfaces 43 constitute geometric references that the control unit uses to control the position of the laser beam 38 (that is to control where the laser beam 38 hits the upper surfaces 43).

Figure 23:
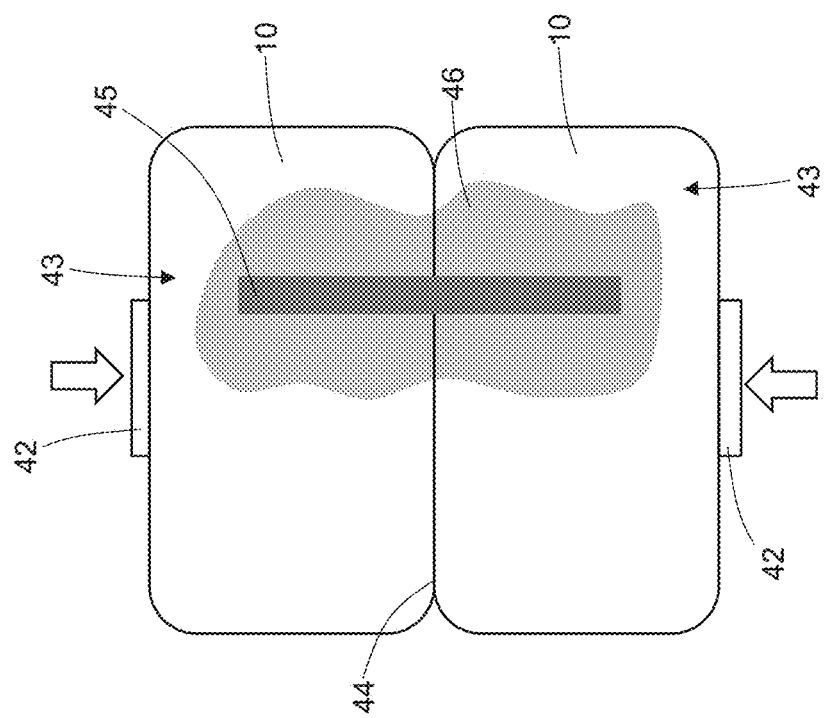

By using the geometric references obtained from the analysis of the digital image of the two upper surfaces 43 of both legs 10 and as shown in FIG. 23, the control unit controls the emitting device 37 in order to aim, at the upper surfaces 43 of the two legs 10, a laser beam 38, which is suited to melt copper (i.e. the metal making up the legs 10) and is fed along a welding line 45 which is perpendicular to the common edge 44 and extends through the common edge 44 itself. According to a preferred embodiment, the position of the welding line 45 is determined based on the position of the center of the two upper surfaces 43, while the orientation of the welding line 45 is determined based on the external edges of the two upper surfaces 43 (in particular, laser beam 38 production is controlled in such a way that the laser beams 38 are parallel to the external edges of the two upper surfaces 43 which are perpendicular to the common edge 44). The laser beam 38 drawing the welding line 45 on the upper surfaces 43 of the two legs 10 causes part of the metal making up the legs 10 to melt, thus determining the formation of a molten metal bath 46 which places itself on both sides of the welding line 45.

By using the geometric references obtained from the analysis of the digital image of the two upper surfaces 43 of both legs 10 and as shown in FIG. 24, the control unit controls the emitting device 37 in order to aim, at the upper surfaces 43 of the two legs 10, a laser beam 38, which is suited to melt copper (i.e. the metal making up the legs 10) and is fed along a welding line 47 which is perpendicular to the common edge 44, extends through the common edge 44, is parallel to and spaced apart from the line 45 and has a length that is smaller than the one of the line 45. According to a preferred embodiment, the position of the welding line 47 is determined based on the position of the center of the two upper surfaces 43, while the orientation of the welding line 47 is determined based on the external edges of the two upper surfaces 43 (in particular, laser beam 38 production is controlled in such a way that the laser beams 38 are parallel to the external edges of the two upper surfaces 43 which are perpendicular to the common edge 44). The laser beam 38 drawing the welding line 47 on the upper surfaces 43 of the two legs 10 causes part of the metal making up the legs 10 to melt, thus determining the formation of a molten metal bath 48 which places itself on both sides of the welding line 47 and merges with the previously generated molten metal bath 46 (thus forming a single molten metal bath).

The fact that the welding line 47 is shorter than the welding line 45 allows the weld to be well balanced, because, even if there is a shorter welding line 47, the molten metal bath 48 has substantially the same volume as the molten metal bath 46; as a matter of fact, the welding line 47 is performed when the upper surfaces 43 of the two legs 10 have already been heated by the previous welding line 45, and therefore, even though it delivers an overall smaller quantity of heat, it causes a substantially equal quantity of metal to melt. Thanks to the right balancing of the two molten metal baths 46 and 48 (obtained by differentiating the lengths of the two welding lines 45 and 47), it is possible to perform a large weld (therefore a mechanically robust and electrically low resistance weld) without the risk of molten metal burrs forming outside the upper surfaces 43 of the two legs 10; said molten metal burrs can be very dangerous because they can cause undesired and potentially destructive short circuits inside the stator winding 8.

According to a further embodiment of the present invention, which is not shown, in some cases it is also possible to use a further (third) welding line, which is perpendicular to the common edge 44, extends through the common edge 44 itself, is parallel to and spaced apart from the welding line 47 and has a length that is smaller than the one of the welding line 47.

According to a preferred embodiment, the welding lines 45 and 47 are not centred relative to one another. In particular, the welding line 45 is symmetrically divided by the common edge 44, while the welding line 47 is asymmetrically divided by the common edge 44; in this way the risk of molten metal burrs forming outside the upper surfaces 43 of the two legs 10 can be further reduced. In the embodiment shown in the accompanying drawings, each welding line 45 and 47 extends from a starting point arranged on a leg 10 to an arrival point arranged on the other leg 10, the starting points of the two welding lines 45 and 47 are arranged at the same distance from the common edge 44, and the arrival points of the two welding lines 45 and 47 are arranged at different distances from the common edge 44.

Owing to the above, it is clear that the laser beams 38 producing the two welding lines 45 and 47 are generated in (quick) succession by a single emitting device 37.

As shown in FIG. 25, once the molten metal baths 46 and 48 have sufficiently cooled down, the jaws 42 of the compression device 41 are uncoupled from the legs 10, thus putting an end to the welding operations. While the welding is being performed, the jaws 42 of the compression device 41 push the two legs 10—and keep them pushed—towards one another along a pushing direction that is perpendicular to the common edge 44. Said push is generated before starting to emit the laser beams 38 and is normally kept up until the molten metal baths 46 and 48 have at least partially cooled down.

According to a preferred embodiment, the two jaws 42 of the compression device 41 have an annular shape, are mounted on the stator winding 8 before beginning to weld and are removed from the stator winding 8 at the end of the welding process. An internal jaw 42 is arranged on the inside of the stator winding 8 in direct contact with the most internal legs 10, and an external jaw 42 is arranged on the outside of the stator winding 8 in direct contact with the most external legs 10, so as to push the most external legs 10 towards the most internal legs 10 and vice versa.

A description has been provided of the ways in which laser welding is performed, with reference to FIGS. 19-25, to weld the ends of two adjacent legs 10, but similar ways are also used to weld a leg 10 to a corresponding connection bridge 18, 28, 30, 32 or 34; with reference to the above-described ways in which laser welding is performed, the use of a compression device is not provided, because the seats 19 of the connection bridges 18, 28, 30, 32 or 34 are plastically deformed beforehand, so as for them to be tight around the ends of the corresponding legs 10.

The above-described ways in which laser welding is performed have numerous advantages, since they allow the welding process to be effective (i.e. a process resulting in a mechanically robust, electrically low resistance and long lasting weld), efficient (i.e. with very limited processing times) and simple (i.e. which can easily be automated and performed with precision without adopting any special measures). The above-described ways in which laser welding is performed do not require a prior peeling (i.e. removing of the external insulating layer) of the final ends of the legs 10 in correspondence to the upper surfaces 43; in other words, in order to perform laser welding as described above, it is not necessary to peel (i.e. remove the external insulating layer of) the final ends of the legs 10 in correspondence to the upper surfaces 43.

The electric machine 1 shown in the accompanying drawings is a synchronous electric machine with permanent magnet rotor, but, obviously, the electric machine 1 may be of any other type (for example asynchronous and therefore without permanent magnets in the rotor).

The invention claimed is:

1. A method to construct an electric machine (1), which comprises:

a stator (5) comprising a magnetic core (6) longitudinally crossed by a plurality of stator slots (7); and a stator winding (8) having a number of phases and comprising a series of rigid bars (9), which are "U"-shaped and are inserted through the stator slots (7) defining an entry side (12), in which the cusps (11) of the "U"-shaped bars (9) are placed, and an exit side (13), in which the legs (10) of the "U"-shaped bars (9) are placed;

the construction method comprises the steps of:

twisting the legs (10) of the "U"-shaped bars (9) coming out from the exit side (13) of the magnetic core (6) through relative double folds, each of which comprises an internal fold (15) in one direction and an external fold (16) in the opposite direction;

electrically connecting to one another the ends of the legs (10) of the "U"-shaped bars (9) so as to form the electrical paths of the stator winding (8);

electrically connecting the ends of at least two non-adjacent legs (10) by means of a connection bridge (18; 28; 30; 32; 34), which is made of a flat plate arranged perpendicular to the central axis (3) of rotation and has, for each leg (10), a corresponding "U"-shaped seat (19), which is suited to receive the end of the leg (10) itself;

initially manufacturing the seats (19) of the connection bridge (18; 28; 30; 32; 34) with a size that is larger, beyond the tolerance needed to simply insert the ends of the legs (10), than the ends of the corresponding legs (10);

inserting into the seats (19) of the connection bridge (18; 28; 30; 32; 34) the ends of the corresponding legs (10), so that the end of each leg (10) is "loose" inside the corresponding seat (19); and locally and plastically deforming the connection bridge (18; 28; 30; 32; 34) so as to tighten the seats (19) of the connection bridge (18; 28; 30; 32; 34) around the ends of the corresponding legs (10).

2. A construction method according to claim 1, wherein:
each seat (19) is delimited on three sides by two lateral walls and by a rear wall which is interposed between the two lateral walls;
each seat (19) is open on the fourth side opposite the rear wall.

3. A construction method according to claim 2, wherein:
at first the two lateral walls of each seat (19) are not parallel to one another and each forms a corresponding obtuse angle with the rear wall; and
once the end of the leg (10) has been inserted into the seat (19), the seat (19) is caused to shrink, thus bringing the two lateral walls closer to each other and therefore the two lateral walls become parallel to each other and each forms a corresponding right angle with the rear wall.

4. A construction method according to claim 1, and comprising the further step of welding the connection bridge (18; 28; 30; 32; 34) to the ends of the corresponding legs (10) after the step of locally and plastically deforming the connection bridge (18; 28; 30; 32; 34).

5. A construction method according to claim 1, wherein:
the connection bridge (18; 28; 30; 32; 34) is made up of a central body with a substantially constant cross-section and of a series of appendages, which project from the central body and are perpendicular to the central body itself; and
each seat (19) is delimited, on the rear side, by the central body and is laterally delimited by a pair of appendages that are arranged one in front of the other.

6. A construction method according to claim 5, wherein, in each seat (19), an appendage has a linear shape in its plan view and the other appendage is "L"-shaped in its plan view, so as to embrace the end of the corresponding leg (10) on two sides.

7. A construction method according to claim 6, wherein the appendage with the linear shape initially forms a right angle with the central body and the "L"-shaped appendage initially forms an obtuse angle with the central body.

8. A construction method according to claim 5, wherein an appendage initially forms a right angle with the central body and the other appendage initially forms an obtuse angle with the central body.

9. A construction method according to claim 1 and comprising the further steps of:
arranging a set of first connection bridges (18), which are coplanar to one another, at a first axial height; and
arranging a set of second connection bridges (28), which are coplanar to one another, at a second axial height that is different from the first axial height, so that the second connection bridges (28) are above the first connection bridges (18).

10. A construction method according to claim 9, wherein:
each first connection bridge (18) has two seats (19) to connect the ends of two corresponding legs (10) to one another; and
each second connection bridge (28) has three seats (19) to connect the ends of three corresponding legs (10) to one another.

* * * * *

UNITED STATES PATENT AND TRADEMARK OFFICE
CERTIFICATE OF CORRECTION

PATENT NO. : 10,277,088 B2
APPLICATION NO. : 15/099980
DATED : April 30, 2019
INVENTOR(S) : Franco Ciampolini et al.

Page 1 of 1

It is certified that error appears in the above-identified patent and that said Letters Patent is hereby corrected as shown below:

In the Claims

Column 15, Line 26 (Claim 5) delete "From" and insert therefor --from--.

Signed and Sealed this
Twentieth Day of August, 2019

Andrei Iancu
*Director of the United States Patent and Trademark Office*